United States Patent
Yamamoto et al.

[11] Patent Number: 6,048,774
[45] Date of Patent: Apr. 11, 2000

[54] METHOD OF MANUFACTURING DYNAMIC AMOUNT SEMICONDUCTOR SENSOR

[75] Inventors: Toshimasa Yamamoto, Ama-gun; Nobuyuki Kato, Seto; Kazuhiko Kano, Toyoake; Makiko Sugiura, Nisshin, all of Japan

[73] Assignee: Denso Corporation, Kariya, Japan

[21] Appl. No.: 09/103,935

[22] Filed: Jun. 25, 1998

[30] Foreign Application Priority Data

Jun. 26, 1997 [JP] Japan ..................... 9-170739
Jun. 26, 1997 [JP] Japan ..................... 9-170740

[51] Int. Cl.[7] .................. H01L 29/84; G01P 15/125; G01P 15/13
[52] U.S. Cl. .................. 438/406; 438/411; 257/417; 73/514.35
[58] Field of Search .................. 438/406, 411; 257/417; 73/514.35

[56] References Cited

U.S. PATENT DOCUMENTS 5,345,824  9/1994  Sherman et al. .
5,461,916  10/1995 Fujii et al. .
5,465,604  11/1995 Sherman .
5,540,095  7/1996  Sherman et al. .
5,541,437  7/1996  Watanabe et al. .

FOREIGN PATENT DOCUMENTS 605 300   7/1994  European Pat. Off. .
5-304303  11/1993 Japan .
6-347474  12/1994 Japan .
8-236788  9/1996  Japan .
9-211022  8/1997  Japan .

*Primary Examiner*—Chandra Chaudhari
*Assistant Examiner*—D. S. Blum
*Attorney, Agent, or Firm*—Pillsbury Madison & Sutro LLP

[57] ABSTRACT

In a method of manufacturing a dynamic amount sensor including a beam structure and a fixed electrode which are respectively supported by anchor parts of a substrate, opening portions are formed on a first semiconductor substrate where the anchor parts are to be formed. Each of the opening portions is composed of a plurality of stripe-like openings. Then a first thin film for forming the anchor parts and a second thin film are formed on the first semiconductor substrate in that order. After the surface of the second thin film is polished, a second semiconductor substrate is bonded to the polished surface of the second thin film. In this method, because the opening portions are composed of the plurality of stripe-like openings, the second thin film is flattened without having any steps thereon.

24 Claims, 19 Drawing Sheets

Fig. 1

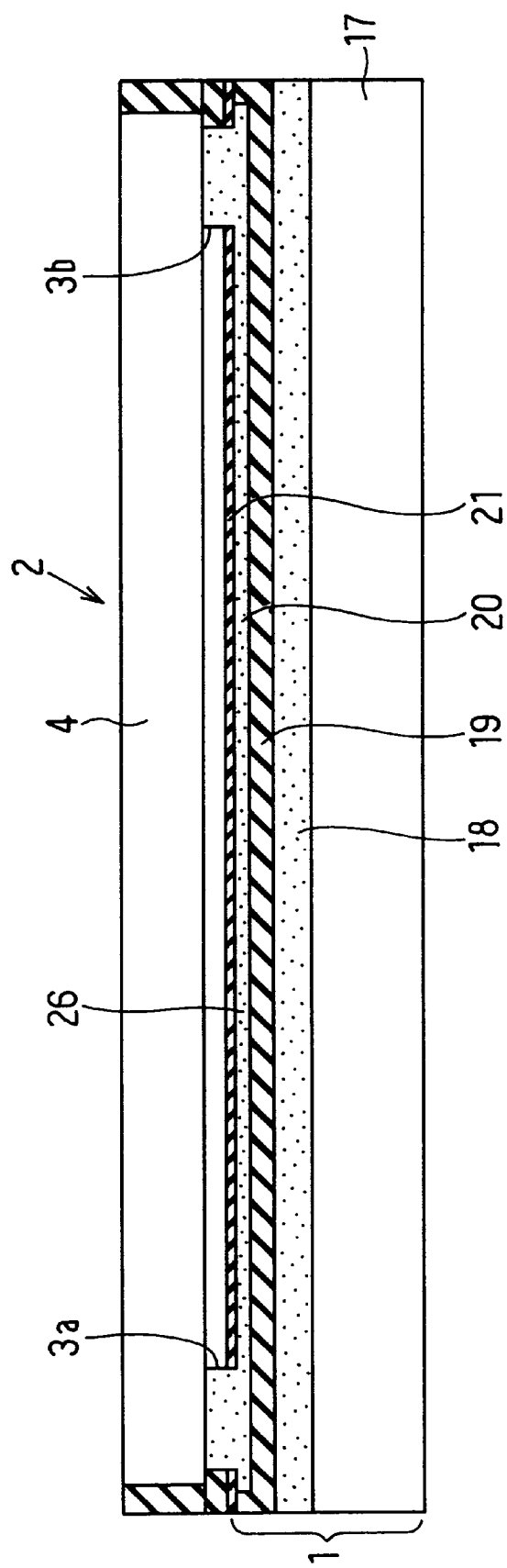

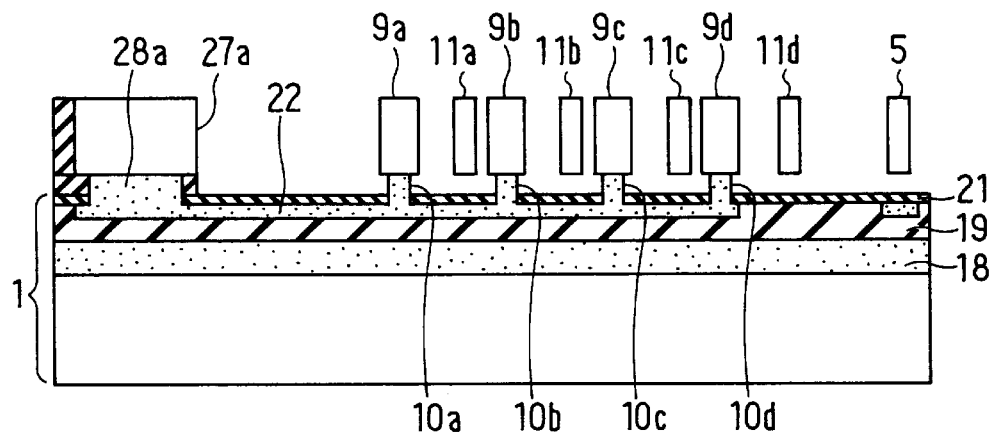
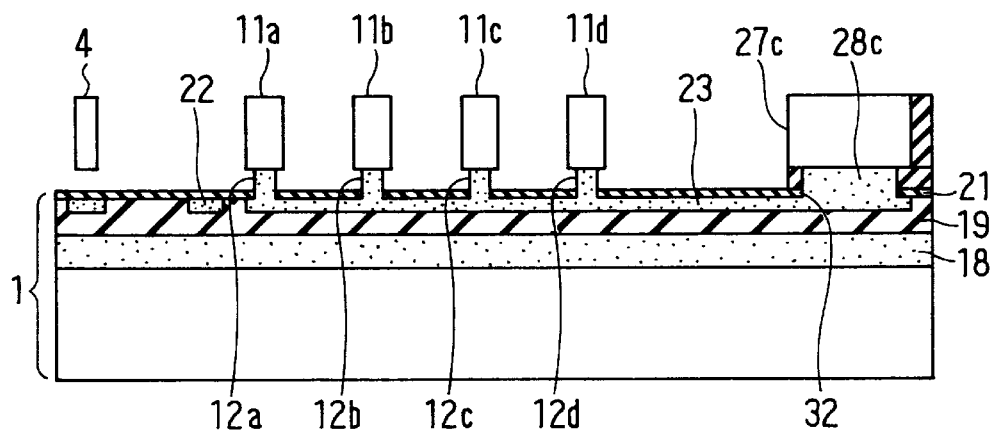
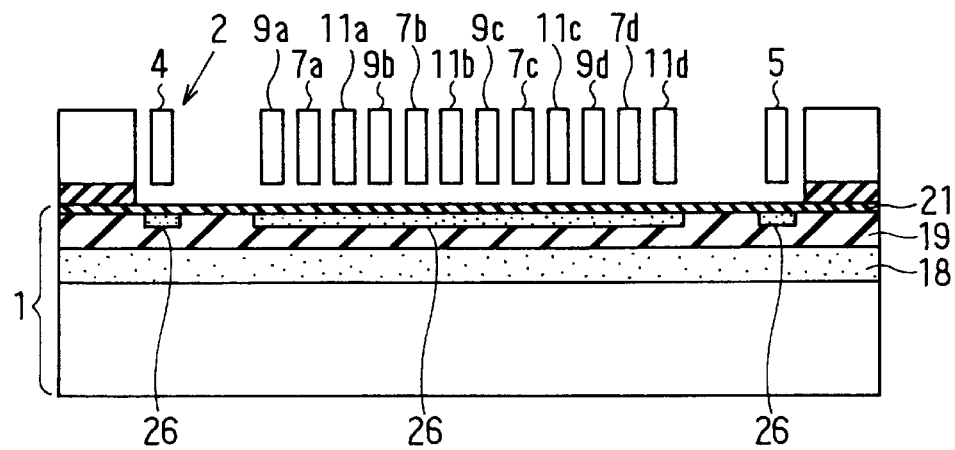

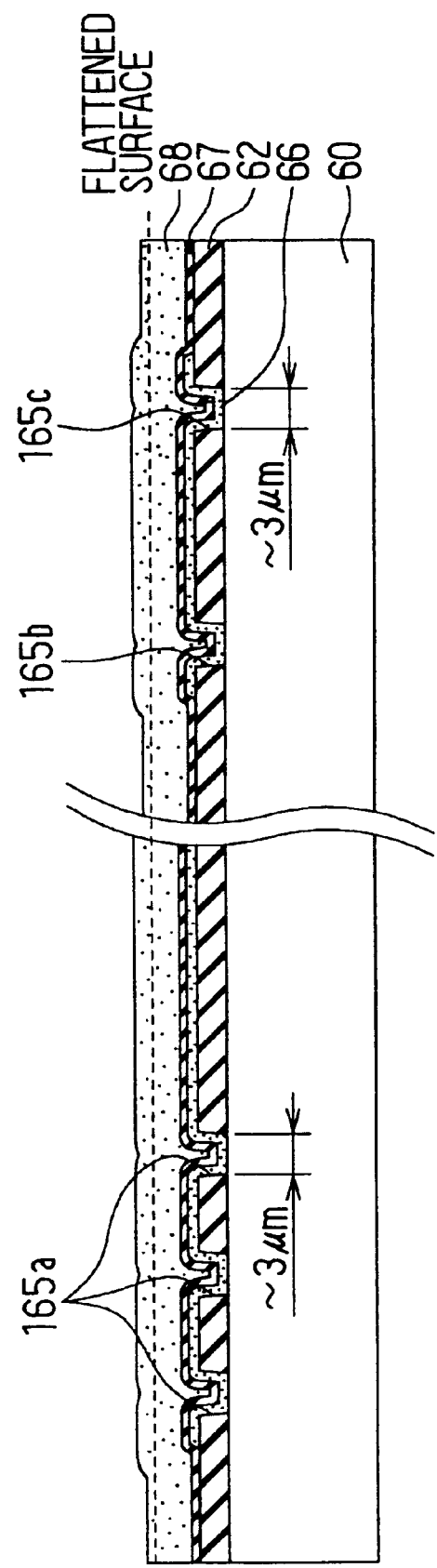

METHOD OF MANUFACTURING DYNAMIC AMOUNT SEMICONDUCTOR SENSOR

CROSS REFERENCE TO RELATED APPLICATIONS

This application is based upon and claims the benefit of priority of the prior Japanese Patent Applications No. 9-170739 filed on Jun. 26, 1997, and No. 9-170740 filed on Jun. 26, 1997, the contents of which are incorporated herein by reference.

BACKGROUND OF THE INVENTION

1. Field of the Invention

The present invention relates to a method of manufacturing a dynamic amount semiconductor sensor having a beam structure for detecting a dynamic amount of such as acceleration, yaw rate, or vibration.

2. Related Arts

The inventors of the present invention proposes, as a dynamic amount semiconductor sensor, a servo-control and differential capacitance type acceleration sensor using an SOI (Silicon-On-Insulator) substrate in JP-A-9-211022. JP-A-9-211011 was not opened and not printed when the present invention was made by the inventors. The method of manufacturing the acceleration sensor includes a process in which a polycrystalline silicon (poly-silicon) layer (bonding layer) formed on a first substrate is bonded to a second substrate (bonding substrate) after the first substrate is flattened. As a result of examinations and studies, the inventors of the present invention found a problem in the process that the poly-silicon layer cannot be sufficiently flattened, so that this may adversely affect the bonding property between the bonding substrate and the poly-silicon layer. When the thickness of the poly-silicon layer is increased, the above problem may be solved. However, in this case, the time for forming the poly-silicon layer is considerably lengthened, resulting in increase in manufacturing cost.

In addition, when the acceleration sensor is manufactured, first of all, grooves are formed in the first substrate, and then the grooves are filled with a silicon oxide layer when the silicon oxide layer is deposited on the first substrate. After the first and second substrates are bonded to each other through the poly-silicon layer, finally, the silicon oxide layer embedded in the grooves is removed by an etching process or the like. As a result, fixed electrodes and a movable beam structure composed of a mass part, movable electrodes, and beams are provided. However, in this method, to fill the grooves with the silicon oxide layer, it is necessary that each width of the grooves is twice larger than the thickness of the silicon oxide layer at most. The limit to the widths of the grooves results in limits to structural parameters of the acceleration sensor such as gaps between the movable electrodes and the fixed electrodes and the widths of the beams. This problem occurs in other dynamic amount sensors such as a yaw rate sensor as well.

SUMMARY OF THE INVENTION

The present invention has been made in view of the above-mentioned problems. A first object of the present invention is, in a method of manufacturing a dynamic amount semiconductor sensor, to flatten a poly-silicon layer for bonding without any steps and without increasing a thickness of the poly-silicon layer. A second object of the present invention is, in a method of manufacturing a dynamic amount semiconductor sensor, to increase flexibility in design relative of grooves for defining a beam structure and fixed electrodes in a substrate.

According to the present invention, a method of manufacturing a dynamic amount semiconductor sensor includes steps of forming a sacrificial layer on a first semiconductor substrate; forming an insulating layer on the sacrificial layer; forming first and second opening portions in the insulating layer and in the sacrificial layer where first and second anchor parts for supporting a beam structure and a fixed electrode are to be formed; forming a first thin film on the insulating layer; forming a second thin film on the first thin film; flattening the surface of the second thin film; bonding the first semiconductor substrate and a second semiconductor substrate with the second thin film interposed therebetween; and removing the sacrificial layer.

To achieve the first object, in the above method, at least one of the first and second opening portions is formed to have a plurality of openings. Accordingly, the second thin film formed on the insulating layer can be flattened without having any steps caused by the opening portions. Preferably, the plurality of openings have stripe-like shapes with widths equal to one another.

To achieve the second object, in the above method, after bonding the first and second semiconductor substrates, a plurality of grooves are formed in the first semiconductor substrate to define the beam structure and the fixed electrode in the first semiconductor substrates. Then, the sacrificial layer is removed by etching through the plurality of grooves, so that the beam structure and the fixed electrode are provided on the second semiconductor substrate. In this method, it is not necessary for the plurality of grooves to be filled with any material, resulting in high design flexibility of the plurality of grooves.

Preferably, an alignment groove is formed in the first semiconductor substrate before the sacrificial layer is formed on the first semiconductor substrate. The alignment groove may be filled with the sacrificial layer or another material. The alignment groove can facilitate the positioning of the plurality of grooves. Further, before the plurality of grooves are formed, the first semiconductor substrate can be polished to have a desired thickness. In this case, the alignment groove can be used to detect the end of the polishing process. That is, as soon as the alignment groove is exposed, the polishing hardness of the first semiconductor substrate changes, so that the end of the polishing process is detected.

BRIEF DESCRIPTION OF THE DRAWINGS

These and other objects and features of the present invention will become more readily apparent from a better understanding of preferred embodiments described below with reference to the following drawings.

FIG. 1 is a plan view showing an acceleration sensor which is proposed by the inventors of the present invention in JP-A-9-211022;

FIG. 2 is a cross-sectional view taken along a II—II line in FIG. 1, showing the acceleration sensor;

FIG. 3 is a cross-sectional view taken along a III—III line in FIG. 1, showing the acceleration sensor;

FIG. 4 is a cross-sectional view taken along a IV—IV line in FIG. 1, showing the acceleration sensor;

FIG. 5 is a cross-sectional view taken along a V—V line in FIG. 1, showing the acceleration sensor;

FIG. 14 is a cross-sectional view schematically showing a state where a poly-silicon layer is formed by a process shown in FIG. 13D;

DETAILED DESCRIPTION OF THE PREFERRED EMBODIMENTS

Figure 1:
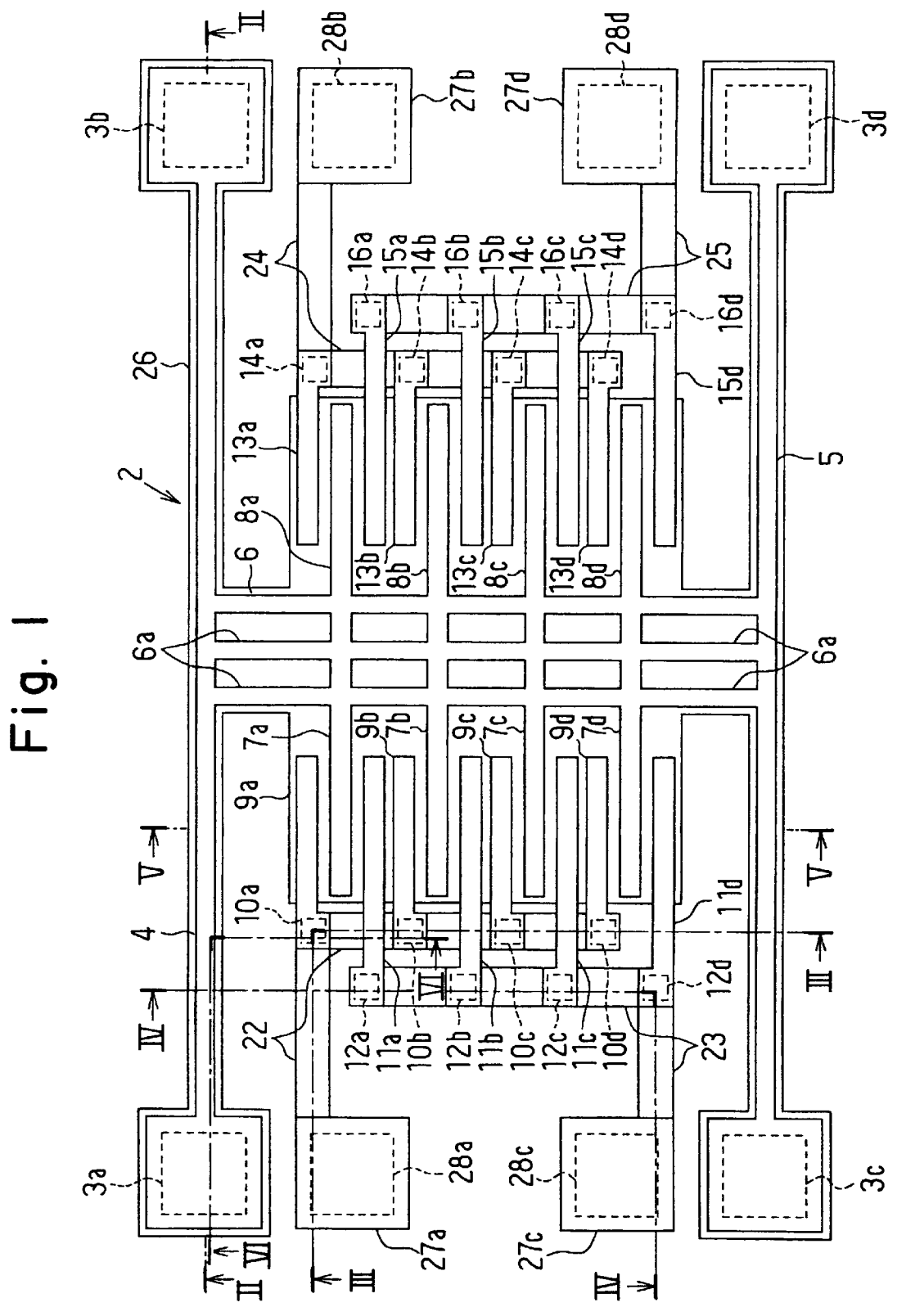
Figure 6A:
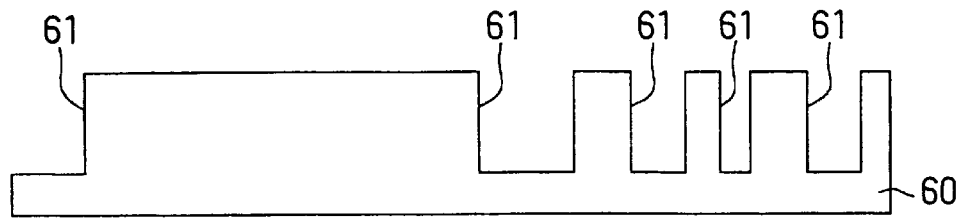
FIGS. 6A–6I are cross-sectional views for explaining a method of manufacturing the acceleration sensor of FIG. 1.

First, referring to FIGS. 1–5, the acceleration sensor proposed in JP-A-9-211022 will be specifically explained. Referring to FIGS. 1, 2, the acceleration sensor has a substrate 1 and a beam structure 2 made of single crystal silicon (single crystal semiconductor material) and disposed on the substrate 1 via four anchor parts 3a–3d protruding from the surface of the substrate 1 defining a specific interval with the surface of the substrate 1. The anchor parts 3a–3d are formed from a poly-silicon thin film. Beam parts 4, 5 are respectively provided between the anchor parts 3a, 3b and between the anchor parts 3c, 3d.

As shown in FIG. 1, a rectangular mass part 6 is provided between the beam parts 4, 5. The mass part 6 has a plurality of vertically penetrating through holes 6a. Further, four first movable electrodes 7a–7d protrude from a side face (left side face in FIG. 1) of the mass part 6, while four second movable electrodes 8a–8d protrude from the other side face (right side face in FIG. 1). The first and second movable electrodes 7a–7d, 8a–8d elongate in parallel with one another at equal intervals to form a comb-like shape.

Referring to FIGS. 1, 3, 4, first and second fixed electrodes 9a–9d, 11a–11d, which are formed into pole-like shapes, are respectively fixed to the substrate 1 at ends thereof. Specifically, the first fixed electrodes 9a–9d are supported by anchor parts 10a–10d at the ends and elongate in parallel with the first movable electrodes 7a–7d toward the mass part 6 defining a specific interval with the surface of the substrate 1. The second fixed electrodes 11a–11b are also supported by anchor parts 12a–12d at the ends and elongate in parallel with the first movable electrodes 7a–7d toward the mass part 6 defining the specific interval with the surface of the substrate 1. Each of the first movable electrodes 7a–7d is interposed between corresponding one of the first fixed electrodes 9a–9d and corresponding one of the second fixed electrodes 11a–11d.

Likewise, on the second movable electrode side, first and second fixed electrodes 13a–13d, 15a–15d, which are formed into pole-like shapes, are respectively fixed to the substrate 1 at ends thereof via anchor parts 14a–14d, 16a–16d protruding from the substrate 1. The structure and arrangement of the first and second fixed electrodes 13a–13d, 15a–15d on the second movable electrode side are substantially the same as those of the first and second fixed electrodes 9a–9d, 11a–11d on the first movable electrode side. That is, the structure of the acceleration sensor is symmetrical on the first and second movable electrode sides with respect to the mass part 6.

Referring again to FIG. 2, the substrate 1 is composed of a silicon substrate 17, and a poly-silicon layer 18, a lower side insulating layer 19, a conductive layer 20, and an upper side insulating layer 21 bonded to the silicon substrate 17 in that order. The lower side insulating layer 19 is made of silicon oxide and the upper side insulating layer 21 is made of silicon nitride. The conductive layer 20 is made of poly-silicon doped with impurities such as phosphorus (P). As shown in FIG. 1, the conductive layer 20 is patterned to form four wiring patterns 22–25 and a lower electrode 26. The four wiring patterns 22–25 are respectively provided for the first and second fixed electrodes 9a–9d, 11a–11d, 13a–13d, 15a–15d, with generally L-like shapes.

Referring to FIGS. 1, 3, 4, the ends of the wiring patterns 22–25 are respectively connected to electrode terminal parts 27a–27d, which are disposed on anchor parts 28a–28d protruding from the substrate 1. The electrode terminal parts 27a–27d respectively and electrically communicate with the wiring patterns 22–25 through the anchor parts 28a–28d. On the surfaces of the electrode terminal parts 27a–27d and of the anchor part 3a, aluminum electrodes (not shown) for serving as bonding pads are respectively disposed.

In the above constitution, on the first movable electrode side, a first capacitor is provided between the first movable electrodes 7a–7d and the first fixed electrodes 9a–9d, while a second capacitor is provided between the first movable electrodes 7a–7d and the second fixed electrodes 11a–11d. Likewise, on the second movable electrode side, the first capacitor is provided between the second movable electrodes 8a–8d and the first fixed electrodes 13a–13d, and the second capacitor is provided between the second movable electrodes 8a–8d and the second fixed electrodes 15a–15d.

Each of the movable electrodes 7a–7d (8a–8d) is disposed in the center between corresponding one of the first fixed electrodes 9a–9d (13a–13d) and corresponding one of the second fixed electrodes 11a–11d (15a–15d). Therefore, electrostatic capacitance C1 between the movable electrodes 7a–7d (8a–8d) and the first fixed electrodes 9a–9d (13a–13d) is equal to electrostatic capacitance C2 between the movable electrodes 7a–7d (8a–8d) and the second fixed electrodes 11a–11d (15a–15a). Further, voltage V1 is applied between the movable electrodes 7a–7d (8a–8d) and the first fixed electrodes 9a–9d (11a–11d), while voltage V2 is applied between the movable electrodes 7a–7d (8a–8d) and the second fixed electrodes 11a–11d (15a–15d).

When no acceleration is applied to the acceleration sensor, voltage V1 is equal to voltage V2. The fixed electrodes 7a–7d (8a–8d) are pulled not only by the first fixed electrodes 9a–9d (13a–13d) but also by the second fixed electrodes 11a–11d (15a–15d) with the same electrostatic forces.

When acceleration is applied to the sensor in parallel with the substrate surface, the movable electrodes 7a–7d (8a–8d) are displaced by the acceleration to change the intervals with the first fixed electrodes 9a–9d (13a–13d) and with the second fixed electrodes 11a–11d (15a–5d). Accordingly, there arises a difference between electrostatic capacitances C1, C2. At that time, voltages V1, V2 are controlled to cancel the difference between the electrostatic capacitances C1, C2, i.e., so that electrostatic capacitances C1, C2 are kept equal to each other. For example, when the movable electrodes 7a–7d (8a–8d) are displaced toward the first fixed electrodes 9a–9d (13a–13d), voltage V1 is decreased and voltage V2 is increased. Accordingly, the movable electrodes 7a–7d (8a–8d) are pulled back by the electrostatic force toward the second fixed electrodes 11a–11d (15a–15d). When the movable electrodes 7a–7d (8a–8d) are returned to the central portions respectively between the first and second fixed electrodes 9a–9d, 11a–11d (13a–13d, 15a–15d) and electrostatic capacitances C1, C2 become equal to each other, the electrostatic force for pulling back the movable electrodes 7a–7d (8a–8d) is proportional to the foraccelesed by the acceleration. Therefore, the magnitude of the acceleration is obtained based on voltages V1, V2 at that time.

Thus, voltages V1, V2 applied to the first and second capacities are controlled with respect to the displacement of the movable electrodes caused by acceleration (dynamic amount) to cancel the displacement of the movable electrodes. As a result, the magnitude of the acceleration is detected.

Figure 6B:
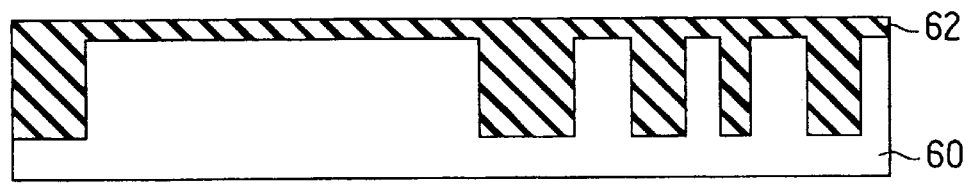

Next, a method of manufacturing the above acceleration sensor will be explained referring to FIGS. 6A–6I, which show VI—VI sections of FIG. 1 in respective processes. First, as shown in FIG. 6A, a plurality of grooves 61 are formed in a single crystal silicon substrate (first semiconductor substrate) 60. After the grooves 61 are formed, impurities such as phosphorus (P) are doped into the silicon substrate 60 by diffusion or the like so that the silicon substrate 60 can work as an electrode for detecting the electrostatic capacitance. Then, as shown in FIG. 6B, a silicon oxide layer 62 for serving as a sacrificial layer is deposited on the silicon substrate 60 as well as in the grooves 61. The surface of the silicon oxide layer 62 is flattened.

Figure 6C:
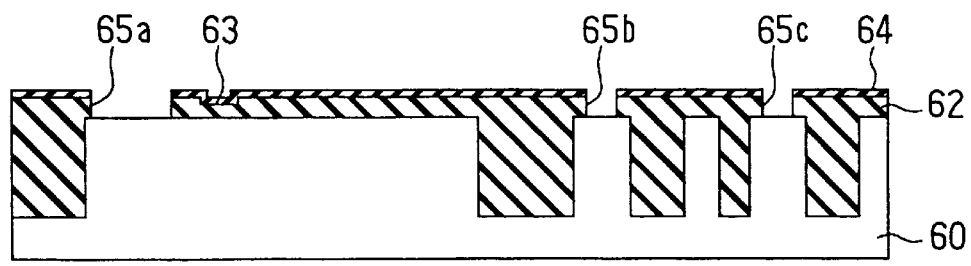

Next, as shown in FIG. 6C, after the silicon oxide layer 62 is partially etched to form a recess 63, a silicon nitride layer (first insulating layer) 64 for serving as an etching stopper when the sacrificial layer is etched is deposited on the silicon oxide layer 62. Then, opening portions 65a–65c for forming the anchor parts are formed not only in the silicon nitride layer 64 but also in the silicon oxide layer 62.

Figure 6D:
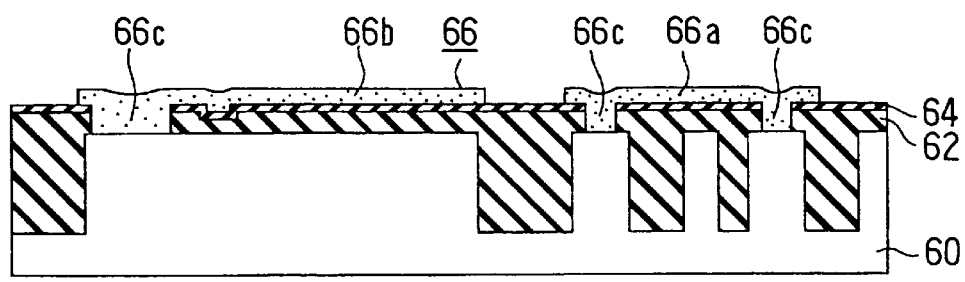
Figure 6E:
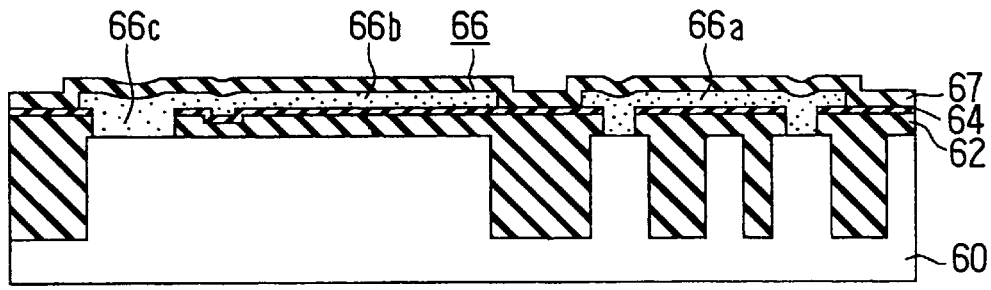
Figure 6F:
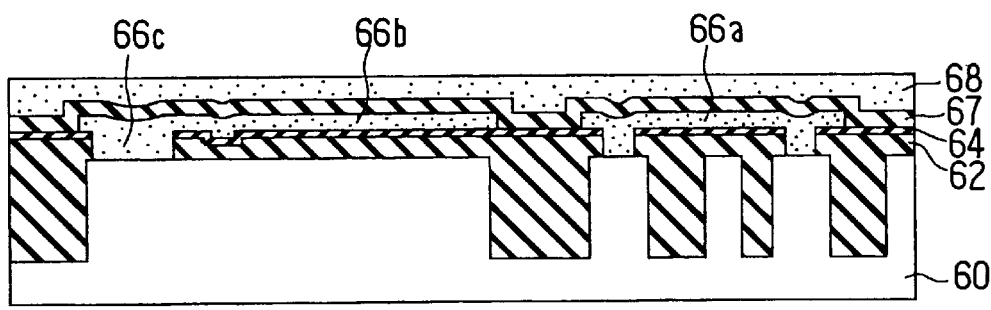

Successively, as shown in FIG. 6D, a poly-silicon layer (first thin film) 66 is formed on the silicon nitride layer 64 and in the opening portions 65a–65c. Then, after impurities such as P are doped into the poly-silicon layer 66, the poly-silicon layer 66 is patterned using a photo-lithography technique and the like to form a wiring pattern 66a, a lower electrode 66b, and anchor parts 66c. Further, as shown in FIG. 6E, a silicon oxide layer (second insulating layer) 67 is formed on the poly-silicon layer 66 and on the silicon nitride layer 64. As shown in FIG. 6F, a poly-silicon layer (bonding layer, second thin film) 68 is formed on the silicon oxide layer 67. Then, the surface of the poly-silicon layer 68 is flattened by for example a mechanical polishing process.

Figure 6G:
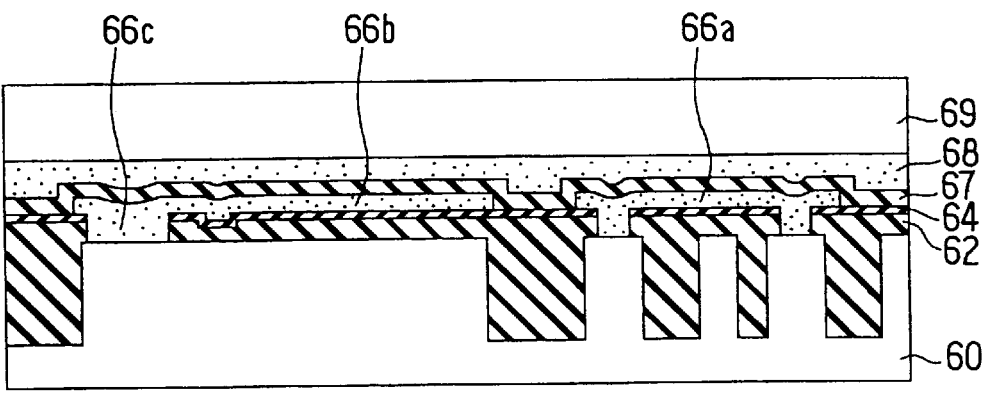
Figure 6H:
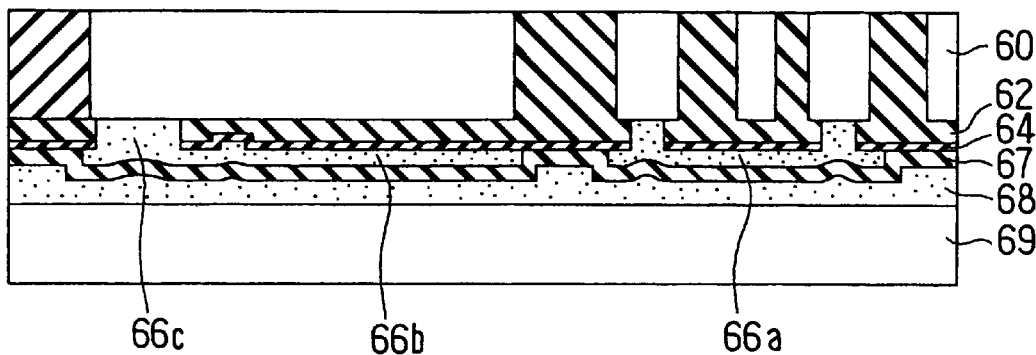

Next, as shown in FIG. 6G, another single crystal silicon substrate (bonding substrate, second semiconductor substrate) 69 are bonded to the surface of the poly-silicon layer 68. Further, as shown in FIG. 6H, the surface of the silicon substrate 60 on the opposite side of the poly-silicon layer 68 is mechanically polished until the silicon oxide layer 62 embedded in the grooves 61 is exposed. That is, the silicon substrate 60 is polished to have a desired thickness. During the polishing process of the silicon substrate 60, as soon as the silicon oxide layer 62 in the grooves 61 is exposed, a polishing hardness of the substrate 60 changes. Therefore, the end of the polishing process can be readily detected.

Thereafter, after an intermediate layer is formed on the polished substrate 60, a contact hole is formed in the intermediate layer. Then, a silicon nitride layer 71 is formed on a specific region of the intermediate layer. Further, an aluminum electrode is formed in the contact hole. The intermediate layer, the contact hole, the silicon nitride layer, and the aluminum electrode are not shown in the figures.

Figure 6I:
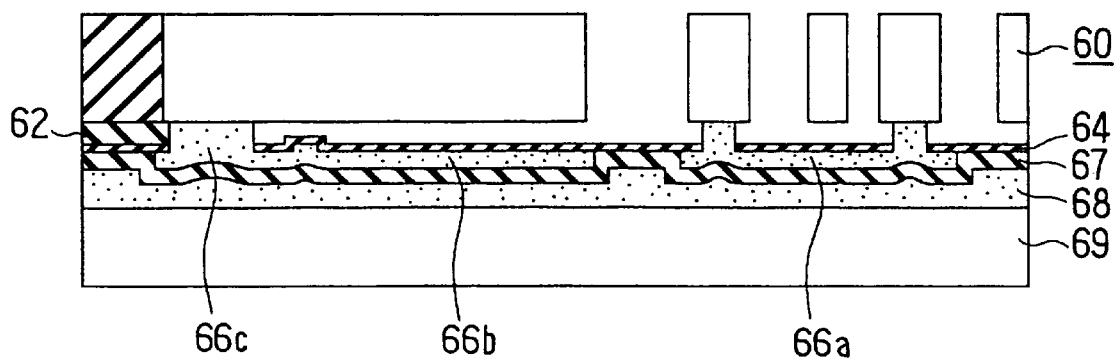

Finally, as shown in FIG. 6I, the silicon oxide layer 62 is removed by an etching process using an etching solution containing hydrogen fluoride (HF), so that the movable beam structure and the fixed electrodes are formed on the silicon substrate 60. This etching process is called the sacrificial layer etching process. In this way, the acceleration sensor is manufactured.

Figure 7:
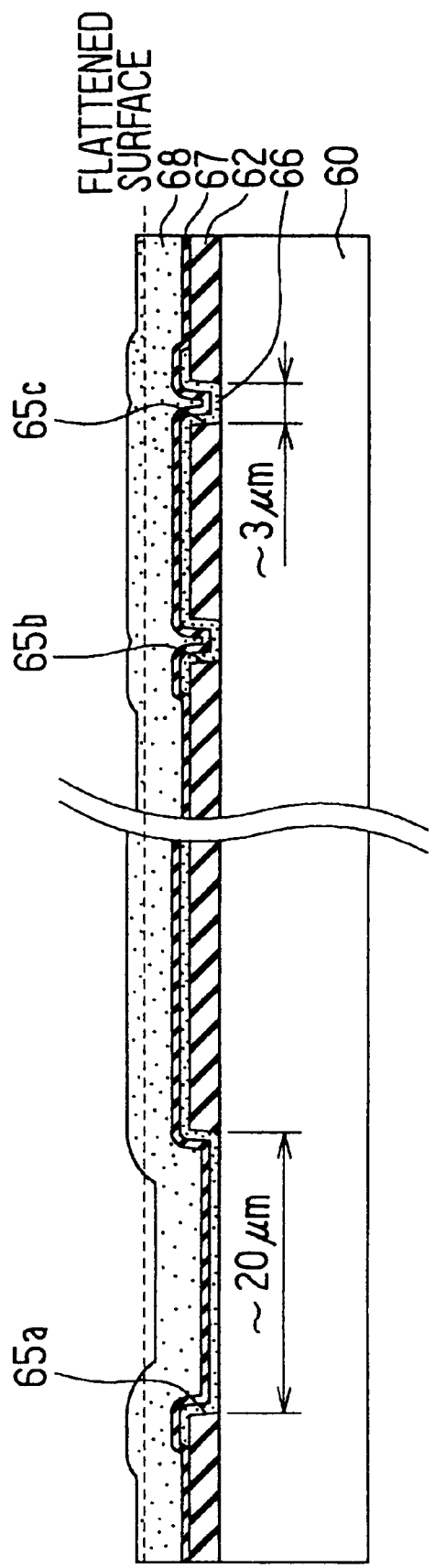
FIG. 7 is a schematic view for explaining a problem in the method of manufacturing the acceleration sensor of FIG. 1.

However, as mentioned in the related art part, the inventors of the present invention found the following two problems in the above manufacturing method. The first problem concerns the formation process of the poly-silicon layer 68 explained referring to FIG. 6F. That is, as schematically shown in FIG. 7, the areas of the opening portions 65a–65c formed in the anchor formation regions are different from one another and in FIG. 7, and the area of the opening portion 65a is the largest of all. In this case, the surface of the poly-silicon layer 68 disposed especially over the opening portion 65a may have a step, even after it is polished. Such a step of the surface of the poly-silicon layer 68 adversely affect the bonding property between the poly-silicon layer 68 and the silicon substrate 69.

In FIG. 7, the thickness of the silicon oxide layer (sacrificial layer) 62 is approximately in a range of 2 μm to 3 μm, the thickness of the silicon oxide layer 67 is approximately in a range of 0.5 μm to 1 μm, and the thickness of the poly-silicon layer 66 is approximately in a range of 3 μm–5 μm. Each width of the opening portions 65b, 65c is 3 μm at most, and the width of the opening portion 65a is 20 μm at most. The silicon nitride layer 64 as the first insulating layer is omitted in the figure.

The second problem concerns the grooves 61 formed in the silicon substrate 60. To fill the grooves 61 with the silicon oxide layer 62 as shown in FIG. 6B, it is necessary that each width of the grooves 61 is twice larger than the thickness of the silicon oxide layer 62 at most. This limits structural parameters of the acceleration sensor such as gaps between the movable electrodes and the fixed electrodes and each width of the beams. The present invention was made to solve the above problems.

(First Embodiment)

Figure 8:
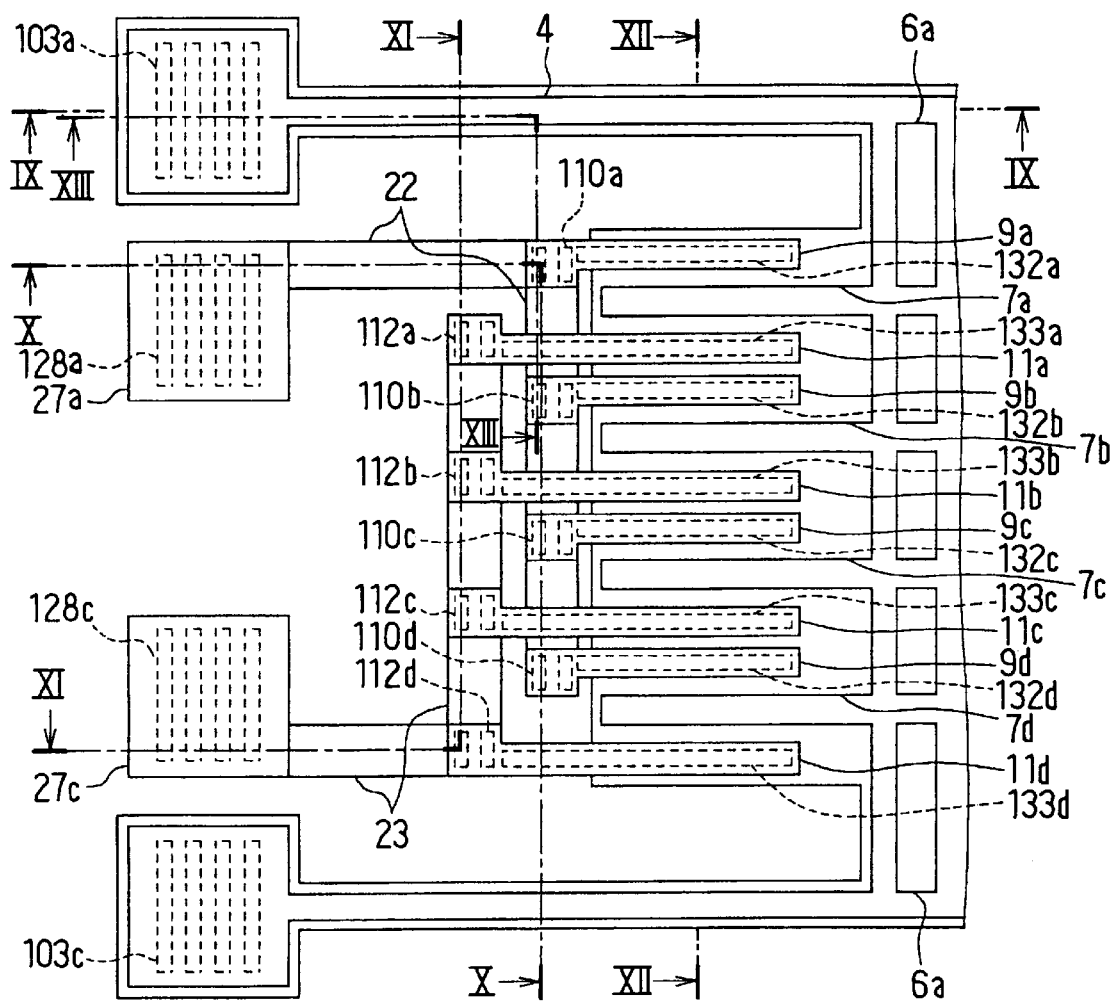
FIG. 8 is a plan view partially showing an acceleration sensor in a first preferred embodiment of the present invention.
Figure 9:
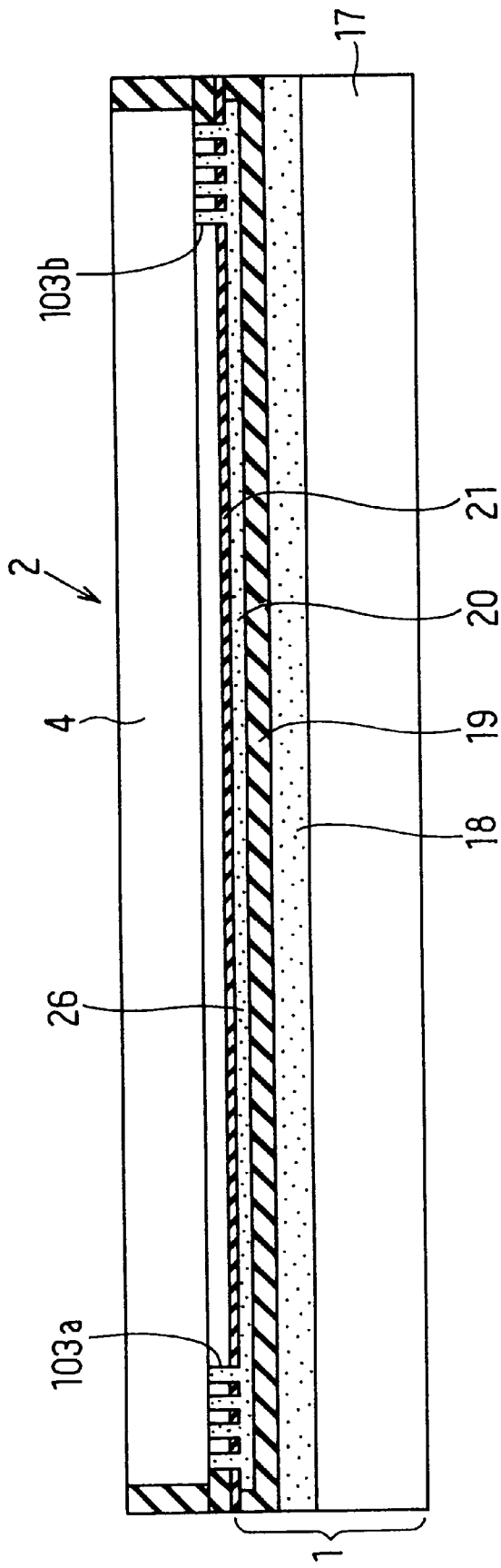
FIG. 9 is a cross-sectional view taken along a IX—IX line in FIG. 8, showing the acceleration sensor.
Figure 10:
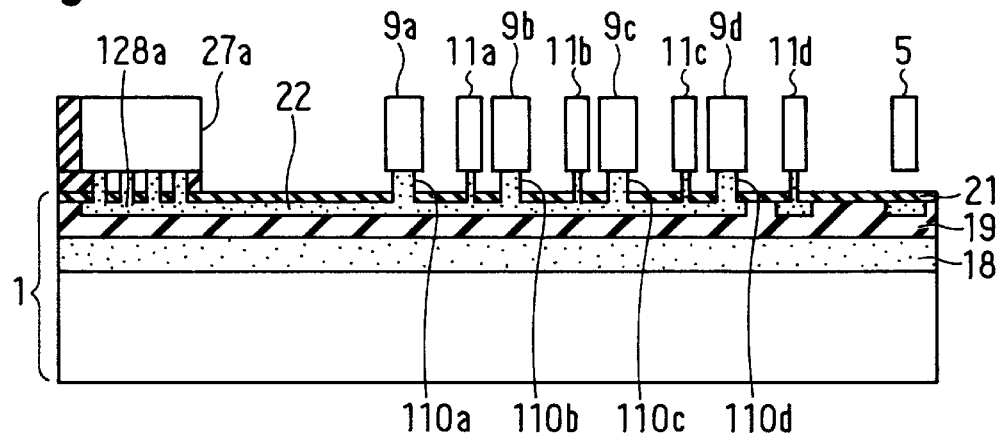
FIG. 10 is a cross-sectional view taken along a X—X line in FIG. 8, showing the acceleration sensor.
Figure 11:
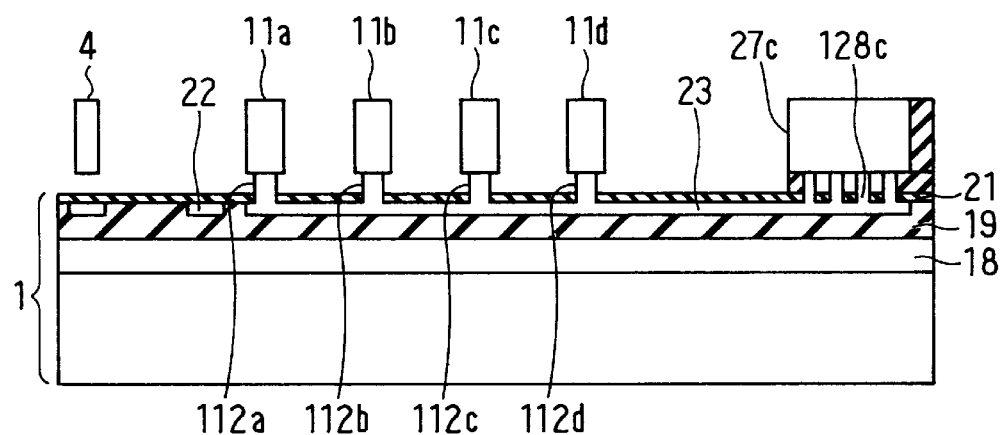
FIG. 11 is a cross-sectional view taken along an XI—XI line in FIG. 8, showing the acceleration sensor.
Figure 12:
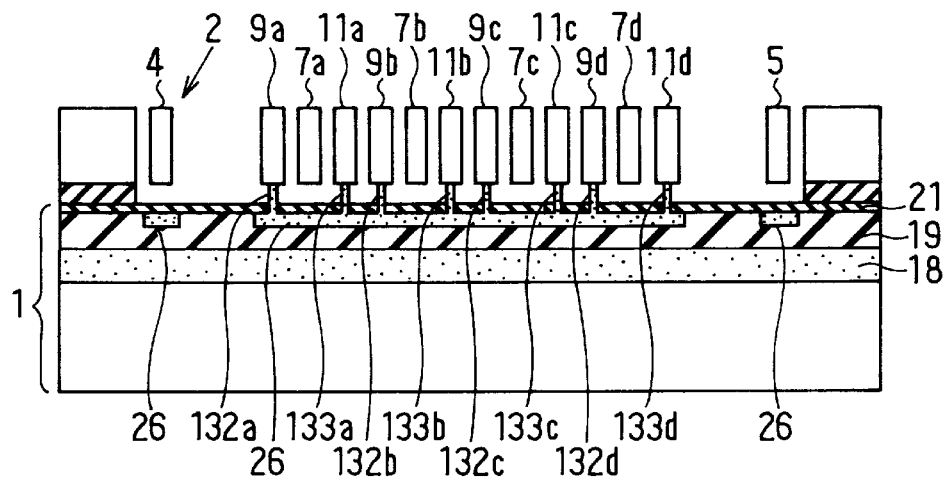
FIG. 12 is a cross-sectional view taken along a XII—XII line in FIG. 8, showing the acceleration sensor.

Hereinbelow, a first preferred embodiment of the present invention will be described. FIG. 8 shows an acceleration sensor in the first embodiment. As shown in FIG. 1, because the acceleration sensor is symmetrical in a right-left direction, FIG. 8 only shows the left side of the acceleration sensor. The same parts as those of the acceleration sensor shown in FIG. 1 are indicated with the same reference numerals. The acceleration sensor in the first embodiment has a structure basically similar to that shown in FIG. 1 except the following points.

That is, referring to FIG. 8, anchor parts 103a, 103C, 128a, 128c respectively have four poly-silicon thin film parts with a specific uniform width as indicated by dashed lines. Anchor parts 110a–110d, 112a–112d respectively have two poly-silicon thin film parts with a specific uniform thickness, which are also indicated by dashed lines. Further, the pole-like elongating portions of the first and second fixed electrodes 9a–9d, 11a–11d are fixed to the substrate 1 through anchor parts 132a–132d, 133a–133d, which are also made of poly-silicon thin film parts. In the anchor parts 103a, 103c, 128a, 128c, 110a–110d, 112a–112d, 132a–132d, 133a–133d, all of the poly-silicon thin film parts have a band-like shape with the same width in a direction perpendicular to the longitudinal directions thereof. The constitution of the acceleration sensor on the right side is substantially the same as those on the left side shown in FIG. 8.

Next, a method of manufacturing the acceleration sensor in the first embodiment will be explained referring to FIGS. 13A–13D, which show cross-sectional views taken along a XIII—XIII line in FIG. 8 in respective processes. First, as explained above referring to FIGS. 6A, 6B, the silicon oxide layer 62 is deposited on the silicon substrate 1 and in the grooves 61 provided in the substrate 1, and the surface of the poly-silicon layer 62 is flattened. Then after the recess 3 is formed on the silicon oxide layer 62 by etching, the silicon nitride layer 64 for the etching stopper in the sacrificial layer etching process is deposited on the silicon oxide layer 62.

Figure 13A:
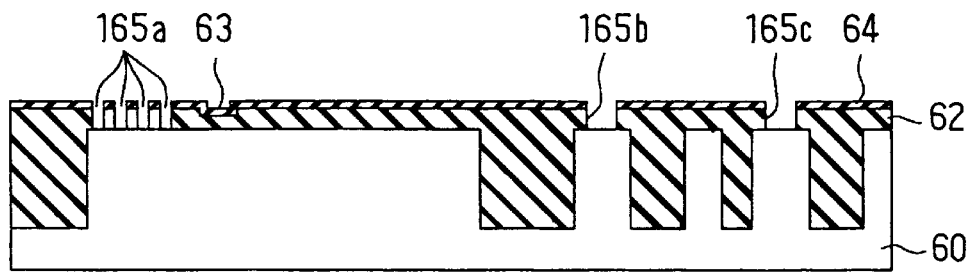
FIGS. 13A–13D are cross-sectional views for explaining a method of manufacturing the acceleration sensor in the first embodiment.

Next, as shown in FIG. 13A, opening portions 165a–165c are formed in the silicon nitride layer 64 and in the silicon oxide layer 62 where the anchor parts are to be formed. The opening portion 165a is composed of four stripe-like openings having widths equal to each other. Each of the opening portions 165b, 165c has two stripe-like openings having widths equal to each other, which are not shown in the figure. This is because the arrangement direction of the two openings of each of the opening portions 165b, 165c is perpendicular to that of the four openings of the opening portion 165a. Further, opening portions (not shown) for the anchor parts for fixing the pole-like elongating portions of the fixed electrodes are formed simultaneously with the opening portions 165a–165c.

Figure 13B:
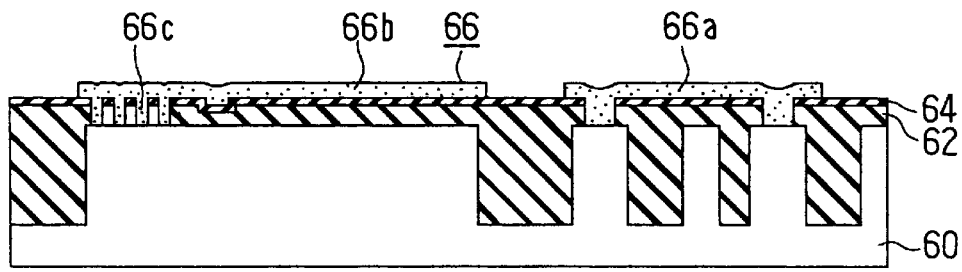
Figure 13C:
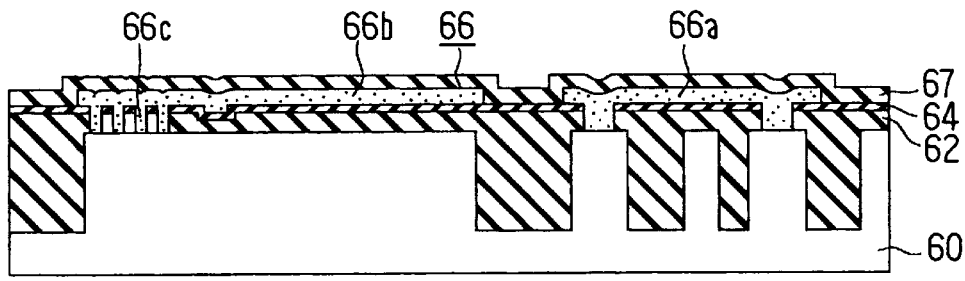
Figure 13D:
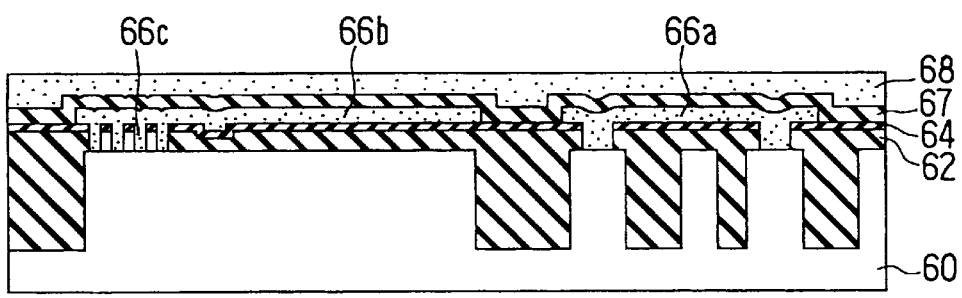

Thereafter, as shown in FIG. 13B, the poly-silicon layer 66 is formed on the silicon nitride layer 64 and in the opening portions 165a–16c. After impurities such as P are doped into the poly-silicon layer 66, the poly-silicon layer 66 is patterned to form the wiring pattern 66a, the lower electrode 66b, and the anchor parts 66c by using the photolithography technique. Then, as shown in FIG. 13C, the silicon oxide layer 67 is formed on the poly-silicon layer 66 and on the exposed silicon nitride layer 64. On the silicon oxide layer 67, the poly-silicon layer 68 which is to be bonded to the second substrate is formed. The surface of the poly-silicon layer 68 is flattened by the mechanical polishing process or the like. The processes shown in FIGS. 13B–13D are substantially the same as those shown in FIGS. 6D–6F.

In the above processes, because the opening portions 165a–165c are respectively composed of the stripe-like openings, as shown in FIG. 14, recesses on the surface of the poly-silicon layer 68 caused by the opening portions 165a–165c are not so large in depth that the surface of the poly-silicon layer 68 cannot be sufficiently flattened by polishing or the like. That is, the surface of the poly-silicon layer 68 disposed over the opening portions 165a–165c is flattened without having any steps.

Subsequently, as explained above referring to FIGS. 6G–6I, the surface of the poly-silicon layer 68 and the silicon substrate 69 are bonded to each other, and the silicon substrate 60 is thinned from the surface on the opposite side of the silicon substrate 69 by the mechanical polishing process or the like. After electrodes are formed on the thinned silicon substrate 60, the movable beam structure is formed from the silicon substrate 60 by removing the silicon oxide layer 62 using the etching solution containing HF in the sacrificial layer etching process. Thus, the acceleration sensor in the first embodiment is manufactured with sufficient bonding property.

In the first embodiment, as shown in FIG. 8, the pole-like elongating portions of the fixed electrodes 9a–9d, 11a–11d are supported by the anchor parts 132a–132d, 133a–133d. Because of this, in a dry process which is conducted after the sacrificial layer etching process, the fixed electrodes 9a–9d, 11a–11d are prevented from moving to attach the movable electrodes. The fixed electrodes 9a–9d, 11a–11d are held at those desired positions.

In the first embodiment, first, the grooves 61 for defining the beam structure are formed in the silicon substrate 60, and the silicon oxide layer 62 as the sacrificial layer is embedded in the grooves 61. Then the silicon oxide layer 62 embedded in the grooves 61 is removed by etching so that the movable beam structure is provided. However, after the silicon substrates 60, 69 are bonded to each other and the electrodes are formed on the bonding substrate 60, the grooves for forming the beam structure may be formed in the silicon substrate 60. The sacrificial layer can be etched through the grooves to be removed. In this case, by forming an alignment groove in the silicon substrate 60 first, the grooves for forming the beam structure can be readily formed.

In the first embodiment, although the present invention is applied to the acceleration sensor using an embedded SOI (Silicon-On-Insulator) substrate, it is obvious that the present invention can be applied to other dynamic amount sensors such as a yaw rate sensor which also utilizes the embedded SOI substrate. Incidentally, the numbers of the openings of the opening portions 165a–165c are not limited, and may be changed if necessary.

(Second Embodiment)

A second preferred embodiment of the present invention concerns a method of manufacturing the acceleration sensor shown in FIGS. 1–5. The method in the second embodiment shown in FIGS. 15A–15G is different from that explained referring to FIGS. 6A–6I and is to enable the acceleration sensor to be flexibly designed. FIGS. 15A–15G also shows VI—VI sections of FIG. 1 in respective processes. Hereinbelow, the processes will be specifically explained.

Figure 15A:
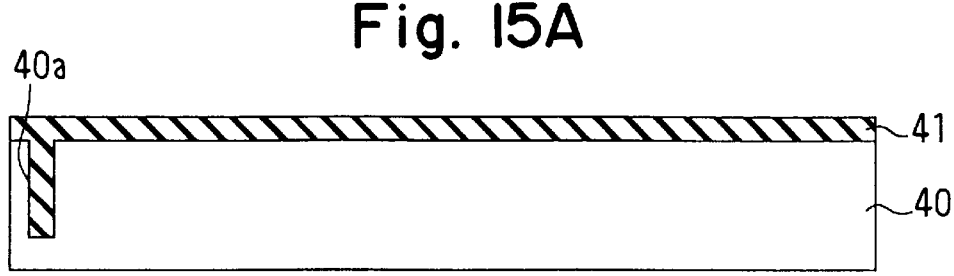
FIGS. 15A–15J are cross-sectional views for explaining a method of manufacturing the acceleration sensor shown in FIG. 1 in a second preferred embodiment.

First, as shown in FIG. 15A, a single crystal silicon substrate (first substrate) 40 is prepared, and impurities such as P are doped into the silicon substrate 40 so that the beam structure formed from the silicon substrate 40 can detect an electrostatic capacitance as the acceleration sensor. After the impurities are doped into the substrate 40, a groove 40a for alignment is formed in the silicon substrate 40 by a trench-etching process. Then, a silicon oxide layer 41 for serving as the sacrificial layer is formed on the silicon substrate 40. At that time, the groove 40a is filled with the silicon oxide layer 41.

Figure 15B:
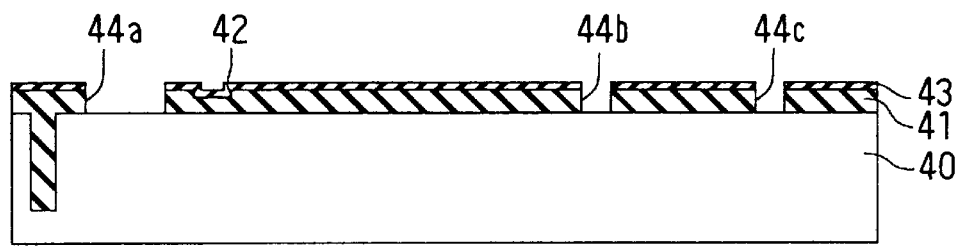

Next, as shown in FIG. 15B, after the silicon oxide layer 41 is partially etched to form a recess 42, a silicon nitride layer (first insulating layer) 43 for serving as a stopper in the sacrificial layer etching process is formed on the silicon oxide layer 41. Then, opening portions 44a–44c are formed not only in the silicon nitride layer 43 but also in the silicon oxide layer 41 to expose the silicon substrate 40 where the anchor parts are to be formed.

Figure 15C:
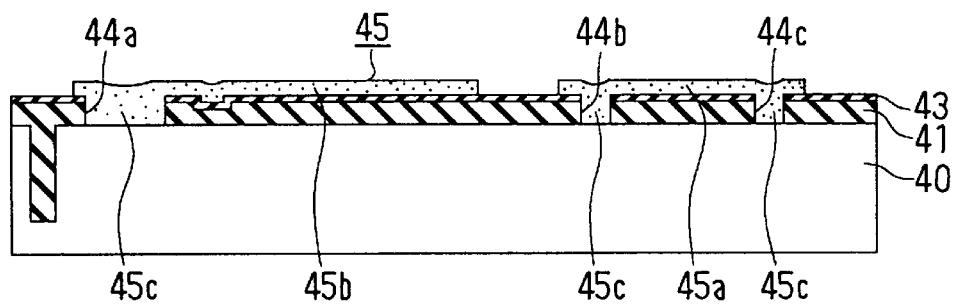
Figure 15D:
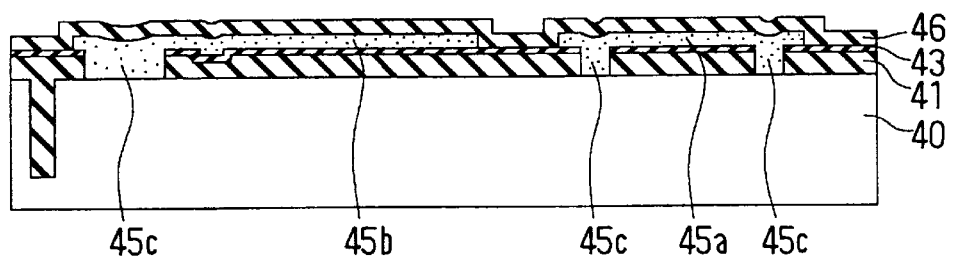
Figure 15E:
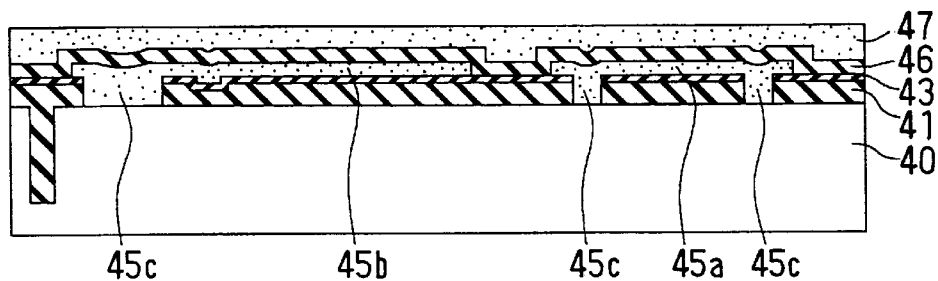

Successively, as shown in FIG. 15C, a poly-silicon layer 45 for forming the anchor parts are formed on the silicon nitride layer 43 and in the opening portions 44a–44c. Impurities such as P are doped into the poly-silicon layer 45, thereby providing conductivity to the poly-silicon layer 45. Then, the poly-silicon layer 45 is patterned to form a wiring pattern 45a, a lower electrode 45b, and anchor parts 45c. Further, as shown in FIG. 15D, a silicon oxide layer (second insulating layer) 46 is formed on the poly-silicon layer 45 and on the exposed silicon nitride layer 43. As shown in FIG. 15E, a poly-silicon layer 47 for bonding is formed on the silicon oxide layer 46. The surface of the poly-silicon layer 47 is flattened by a mechanical polishing process or the like.

Figure 15F:
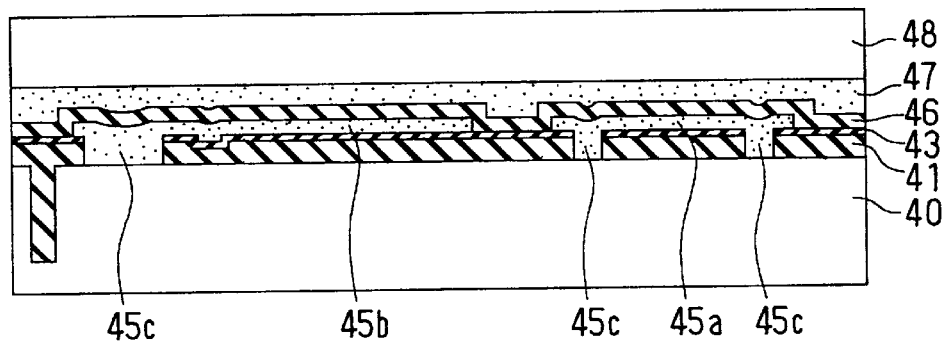
Figure 15G:
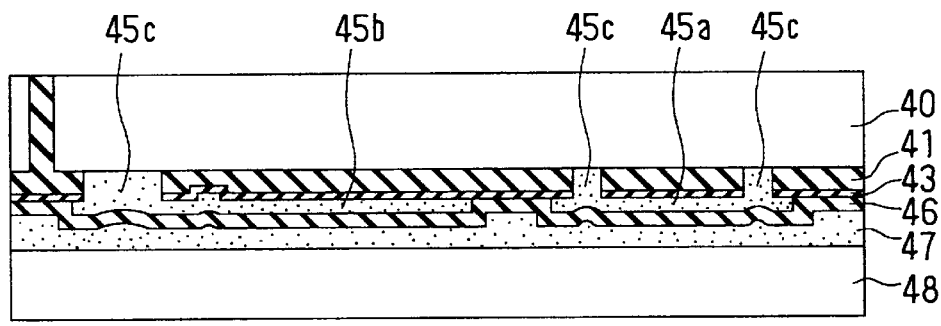

Next, as shown in FIG. 15F, another single crystal silicon substrate (second semiconductor substrate) 48 is bonded to the silicon substrate 40 with the poly-silicon layer 47 interposed therebetween. Further, as shown in FIG. 15G, the surface of the silicon substrate 40 on the opposite side of the silicon substrate 48 is polished by a mechanical polishing process or the like so that the substrate 40 has a desired thickness. At that time, as soon as the silicon substrate 40 is polished to expose the silicon oxide layer 41 embedded in the groove 40a, the polishing hardness of the substrate 40 changes, so that the end of the polishing process is easily detected. In the subsequent processes, the exposed silicon oxide layer 41 in the groove 40a works as an alignment mark.

Figure 15H:
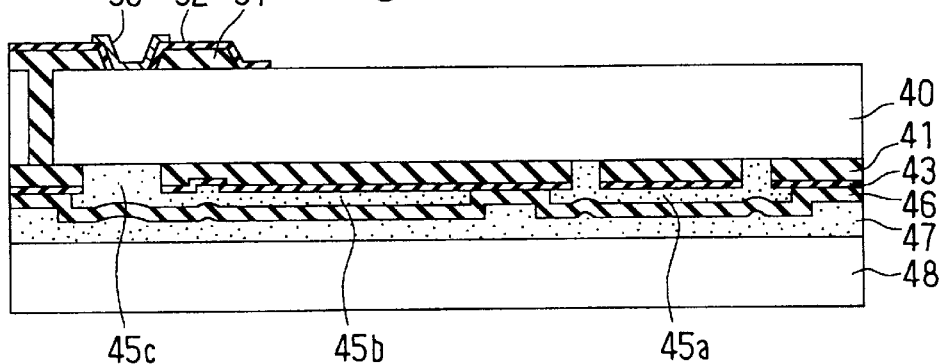
Figure 15:
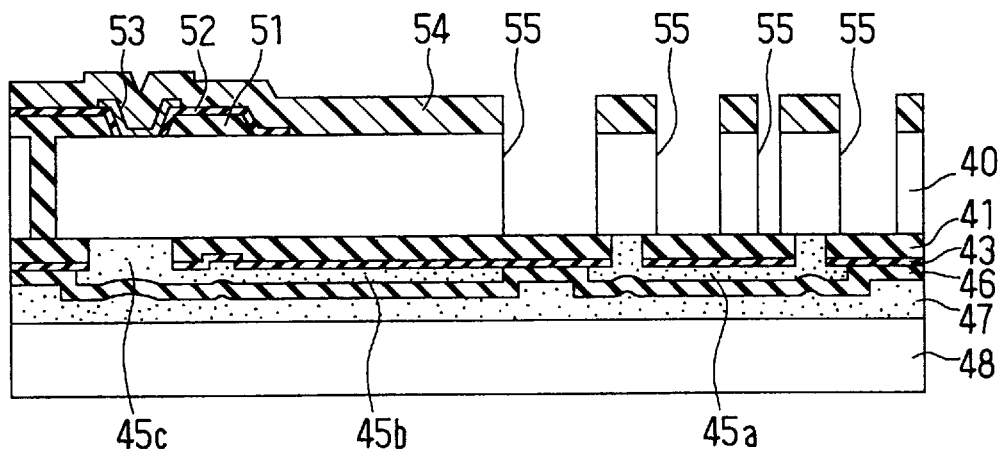

Then, as shown in FIG. 15H, an intermediate insulating layer 51 is formed on the substrate 40, and is patterned to form a contact hole therein by an etching process or the like. Then, a silicon nitride layer is formed on specific regions of the intermediate layer 51. In the contact hole, an aluminum electrode 53 is formed. Thereafter, as shown in FIG. 15I, grooves 55 for defining the beam structure and the fixed electrodes are formed in the silicon substrate 40 by a trench-etching process using a mask member 54. The mask member 54 may be a soft mask such as photo-resist, or be a hard mask such as an oxide layer.

Figure 15J:
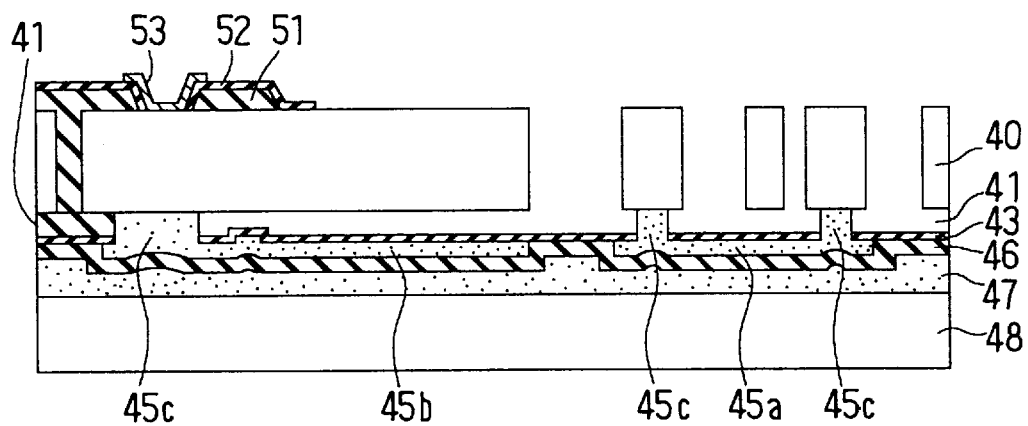

Finally, as shown in FIG. 15J, the silicon oxide layer 41 is removed by the sacrificial layer etching process using an etching solution including HF, so that the beam structure becomes movable. After the sacrificial layer etching process, a dry process is performed using a sublimation agent such as paradichlorobenzene. The sublimation agent is to prevent the movable part from adhering the surface of the substrate 40. In the sacrificial layer etching process, the anchor parts 45c are not etched, because it is made of poly-silicon which is not resolved by HF contained in the etching solution. Accordingly, in the sacrificial layer etching process, it is not necessary to precisely control the concentration, temperature of the etching solution and the etching time. Thus, the acceleration sensor shown in FIG. 1 is manufactured.

In the second embodiment, after the aluminum electrode 53 is formed on the silicon substrate 40, the grooves 55 are formed to define the beam structure and the fixed electrodes in the silicon substrate 40. The silicon oxide layer 41 as the sacrificial layer is etched through the grooves 55. The grooves 55 need not be filled with the silicon oxide layer. Each width of the grooves 55 can be flexibly set without considering the process for filling the grooves 55 with the silicon oxide layer. Therefore, the acceleration sensor can be flexibly designed compared to the method explained referring to FIGS. 6A–6I.

In this embodiment, the groove 40a for alignment is filled with the silicon oxide layer 41 when the silicon oxide layer 41 is formed on the silicon substrate 40. In the polishing process of the silicon substrate 40 shown in FIG. 15G, as soon as the silicon oxide layer 41 embedded in the groove 40a is exposed by polishing, the polishing hardness of the substrate 40 changes, so that the end of the polishing process is easily detected. However, in this case, stress caused by the silicon oxide layer 41 may be applied to the silicon substrate 40 surrounding the groove 40a to cause cracks in the silicon substrate 40. In addition, because the polishing speed of the silicon substrate 40 is faster than that of the silicon oxide layer 41, if the polishing process is continuously performed after the silicon oxide layer 41 is exposed, the surface of the silicon substrate 40 may be dented than the silicon oxide layer 41.

Figure 16:
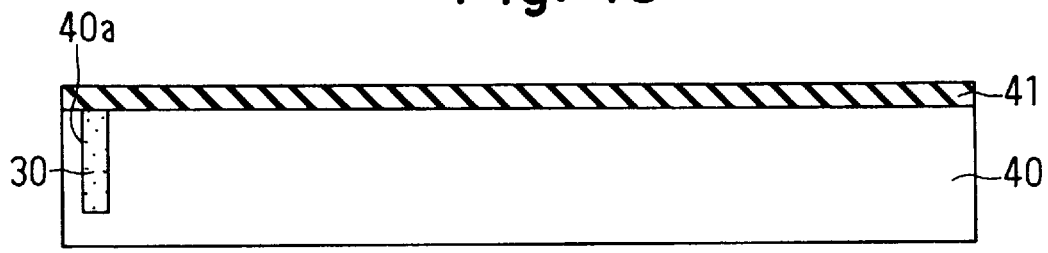
FIG. 16 is a cross-sectional view for explaining a modified process corresponding to that shown in FIG. 15A, for manufacturing the acceleration sensor in the second embodiment.

To solve the above problems, as shown in FIG. 16, the groove 40a can be filled with other material such as poly-silicon, which has a polishing rate approximately equal to that of the silicon substrate 40, as an alignment mark part 30. In this case, after the alignment mark part 30 is formed in the groove 40a, the silicon oxide layer 41 is formed on the silicon substrate 40 and on the alignment mark part 30. Then the processes shown in FIGS. 17B–17J are performed as mentioned above.

The method in the second embodiment is used for manufacturing the acceleration sensor shown in FIG. 1; however, it can be used for manufacturing the acceleration sensor in the first embodiment shown in FIG. 8. That is, the opening portions 44a can be composed of a plurality of, for example four stripe-like openings having constant widths and the opening portions 44b, 44c can be composed of a plurality of, for example two stripe-like openings having constant widths and arranged perpendicularly to the openings of the opening portions 44a. In this case, the same effects as in the first embodiment can be obtained.

(Third Embodiment)

In the first and second embodiments, the present invention is applied to the method of manufacturing the acceleration sensor; however, in a third preferred embodiment, the present invention is applied to a method of manufacturing a yaw rate sensor.

Figure 17:
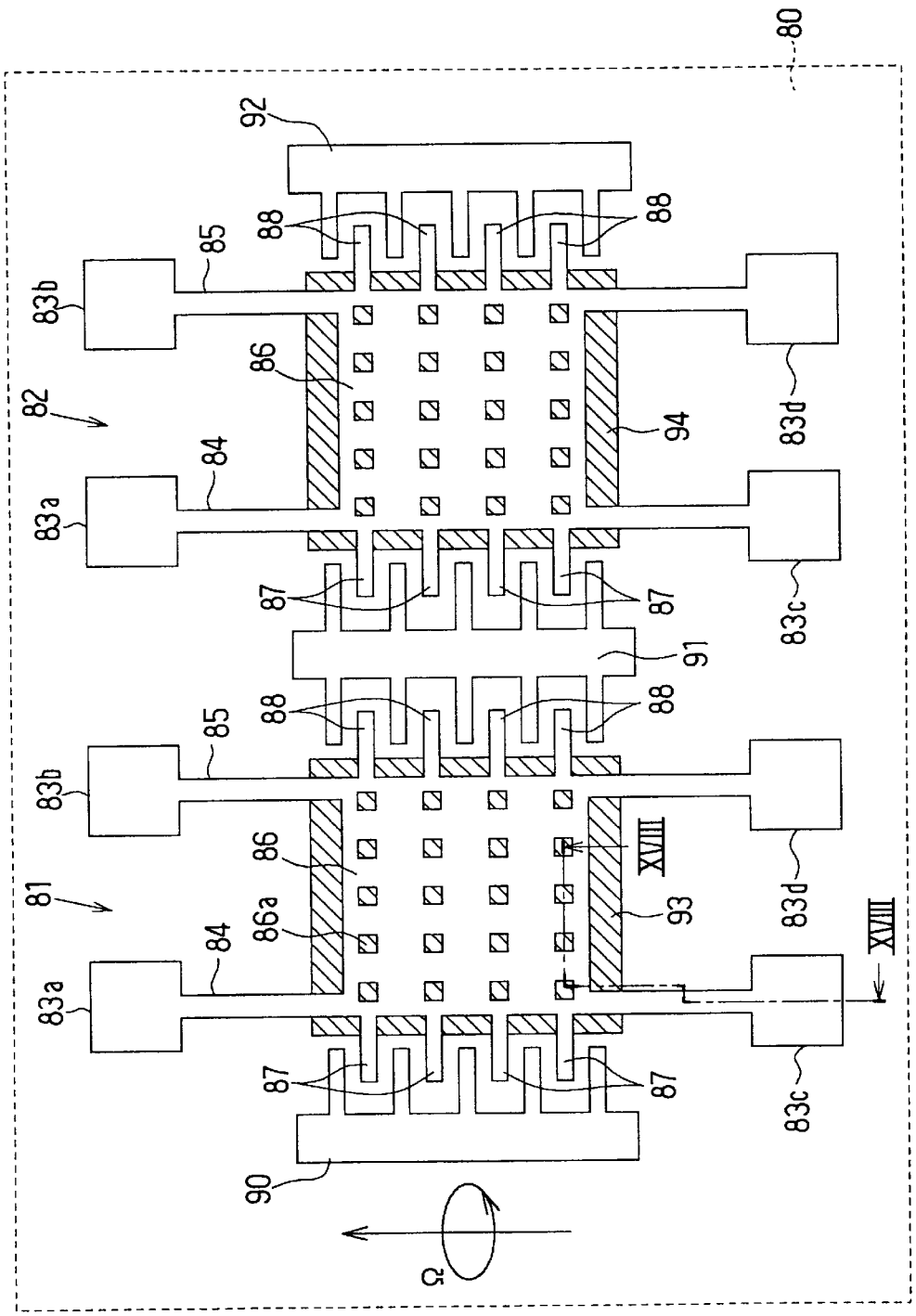
FIG. 17 is a plan view showing a yaw rate sensor in a third preferred embodiment.

Referring to FIG. 17, the yaw rate sensor in the third embodiment has beam structures (movable members) 81, 82 disposed on a substrate 80. The beam structures 81, 82 vibrate in opposite phases, so that differential detection is performed to detect a yaw rate. The beam structure 81 is supported by four anchor parts 83a–83d protruding from the substrate 80 to define a specific interval with the surface of the substrate 80. A beam 84 is provide between the anchor parts 83a, 83c, and a beam 85 is provided between the anchor parts 83b, 83d. A mass part 86 is provided between the beams 84, 85. The mass part 86 has a plurality of vertically penetrating through holes 86a.

A plurality of movable electrodes 87 for vibration are disposed on a side face of the mass part 86 to protrude from the mass part 86 with a comb-like arrangement. Likewise, a plurality of movable electrodes 88 for vibration are disposed on the opposite side face of the mass part 86 to protrude from the mass part 86 in an opposite direction of the movable electrodes 87 with a comb-like arrangement. The movable electrodes 87, 88 respectively have a pole-like shape and elongate in parallel with one another with equal intervals. The beam structure 82 has the same structure as that of the beam structure 81. In FIG. 17, the same parts of the beam structure 82 as those of the beam structure 81 are indicated with the same reference numerals.

Fixed electrodes 90–92 for vibration are supported by anchor parts protruding from the substrate 80 and have comb-like shapes respectively facing the movable electrodes 87, 88. Lower electrodes (yaw rate detecting fixed electrodes) 93, 94 are respectively provided on the surface of the substrate 80 to face the mass parts 86 of the beam structures 81, 82.

In the above constitution, driving voltages having opposite phases are applied between the movable electrodes 87 and the fixed electrodes 90 and between the movable electrodes 88 and the fixed electrodes 91. Accordingly, the beam structures 81, 82 respectively vibrate in directions parallel to the surface of the substrate 80 by electrostatic forces between the electrodes 87 and 90, and between the electrodes 88 and 91.

When yaw $\Omega$ is produced in a direction shown in FIG. 17, Coriolis force fc is applied to the vibrating beam structures 81, 92 in a direction perpendicular to the surface of the substrate 80. Coriolis force fc is expressed by the following formula (1);

$$fc = 2\ mV\Omega \tag{1}$$

in which m is the weight of each mass part 86 and V is a vibration rate. The Coriolis force fc displaces the mass parts 86 of the beam structures 81, 82 when the beam structures 81, 82 are excited to vibrate. The displacements of the mass parts 86 change electrostatic capacitances of capacitors formed between the beam structures 81, 82 and the lower electrodes 93, 94. As a result, the displacement amounts of the mass parts 86 are detected as the changes in electrostatic capacitance between the beam structures 81, 82 and the lower electrodes 93, 94.

In the yaw rate sensor of this embodiment, because the phase of the vibration of the beam structure 81 is shifted from that of the beam structure 82 by 180°, the displacement directions of the beam structures 81, 82 are opposite to each other. Accordingly, the yaw rate sensor conducts the differential detection to detect the yaw rate with high accuracy.

Figure 18A:
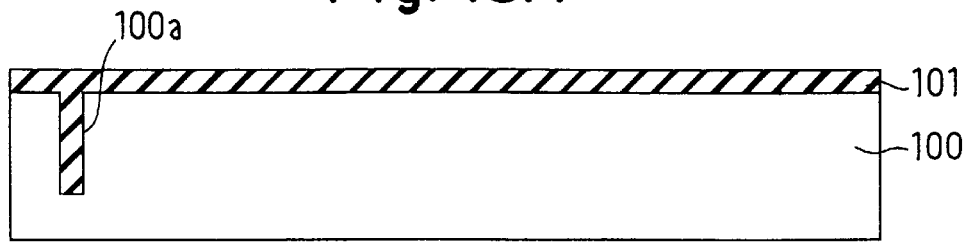
FIGS. 18A–18J are cross-sectional views for explaining a method of manufacturing the yaw rate sensor in the third embodiment.

Next, a method of manufacturing the yaw rate sensor will be explained using a XVIII—XVIII section of FIG. 17. First, referring to FIG. 18A, an N-type single crystal silicon substrate (first semiconductor substrate) 100 is prepared. A groove 100a for alignment is formed in the silicon substrate 100 by a trench-etching process. Then, a silicon oxide layer 101 for serving as a sacrificial layer is deposited on the silicon substrate 100 and in the groove 100a by a chemical vapor deposition (CVD) method or the like.

Figure 18B:
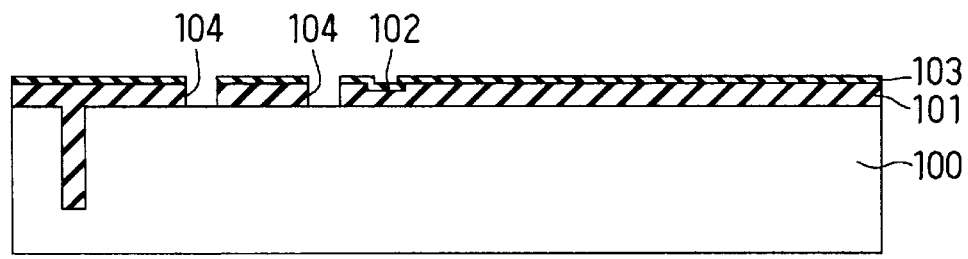

Next, as shown in FIG. 18B, the silicon oxide layer 101 is partially etched to form a recess 102. The recess 102 is to provide a protrusion for decreasing an area where the beam structure is attached to the surface of the substrate 100 by a surface tension and the like in a sacrificial layer etching process described below. Further, a silicon nitride layer (first insulating layer) 103 is formed on the silicon oxide layer 101. The silicon nitride layer 103 serves as a stopper in the sacrificial layer etching process. Then, opening portions 104 for forming the anchor parts are formed in the silicon nitride and silicon oxide layers 103, 101 by a photo-lithography process and a dry-etching process or the like. The opening portions 104 are formed to correspond to all of the anchor parts for the beam structures 81, 82 and for the fixed electrodes 90–92.

Figure 18C:
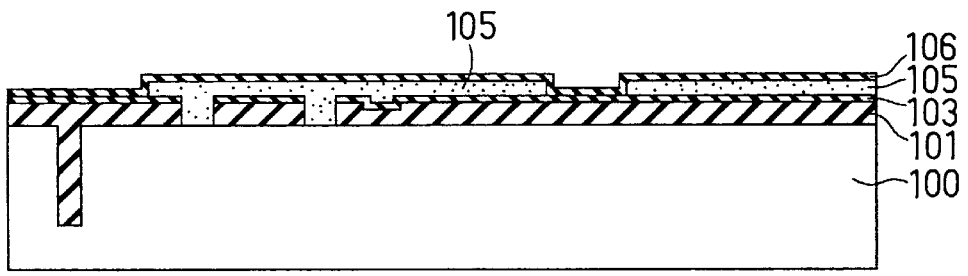
Figure 18D:
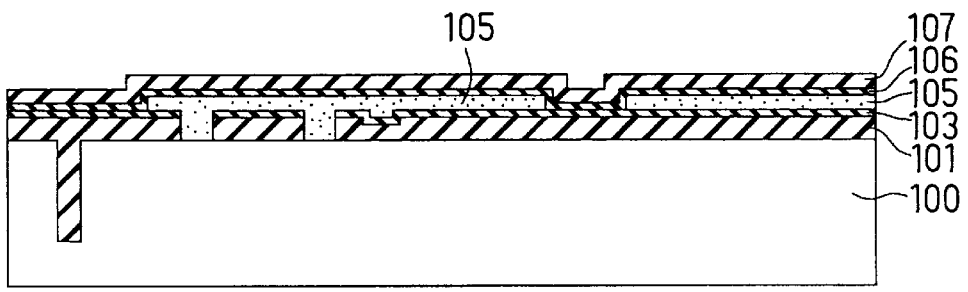

Successively, as shown in FIG. 18C, a poly-silicon layer 105 for forming the anchor parts is deposited on the silicon nitride layer 103 and in the opening portions 104 to have a thickness in a range of 0.5 $\mu$m to 2 $\mu$m. During or after the deposition of the poly-silicon layer 15, impurities are doped into the poly-silicon layer 15, so that the poly-silicon layer 15 becomes conductive. The impurity-doped poly-silicon layer 105 is patterned using the photo-lithography technique, so that it remains on specific regions on the opening portions 104 and on the silicon nitride layer 103. Then, a nitride layer 106 is formed to cover the poly-silicon layer 105. In the photo-lithography process of the poly-silicon layer 105, because the thickness of the poly-silicon layer 105 is so thin that the shapes of the opening portions 104 can be observed through the poly-silicon layer 105. Therefore, a photo-mask for the poly-silicon layer 105 is readily and precisely aligned. Then, as shown in FIG. 18D, a silicon oxide layer (second insulating layer) 107 is deposited on the nitride layer 106.

Figure 18E:
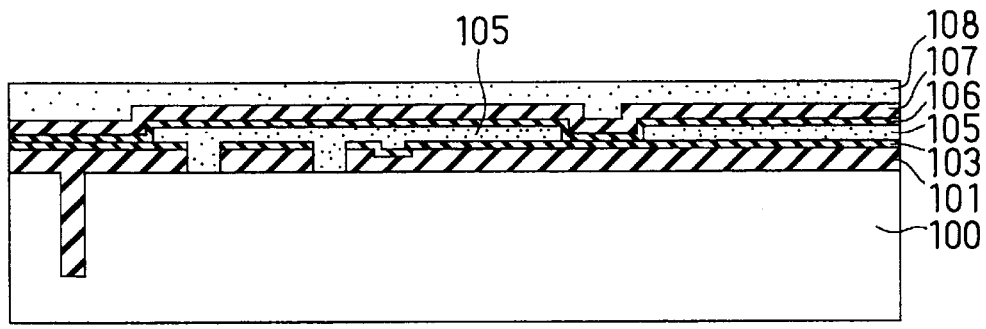
Figure 18F:
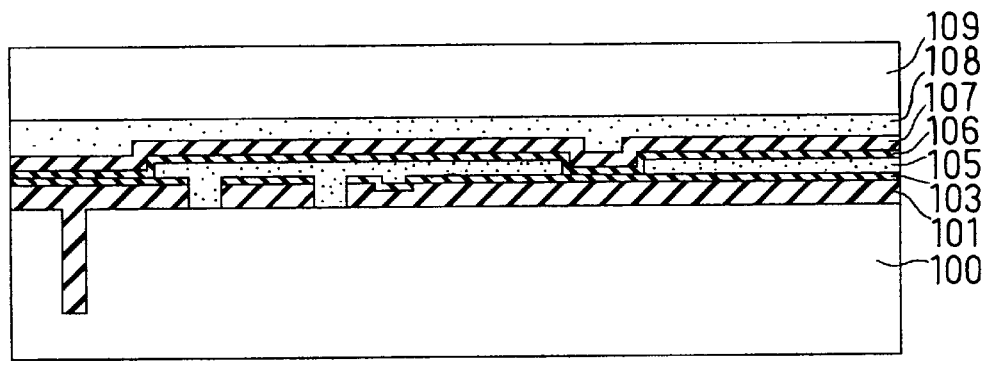

Further, as shown in FIG. 18E, a poly-silicon layer 108 for bonding is deposited on the silicon oxide layer 107. The surface of the poly-silicon layer 108 is flattened by a mechanical polishing process or the like. Then, as shown in FIG. 18F, another single crystal silicon substrate (second semiconductor substrate) 109 is bonded to the flattened surface of the poly-silicon layer 108.

Figure 18G:
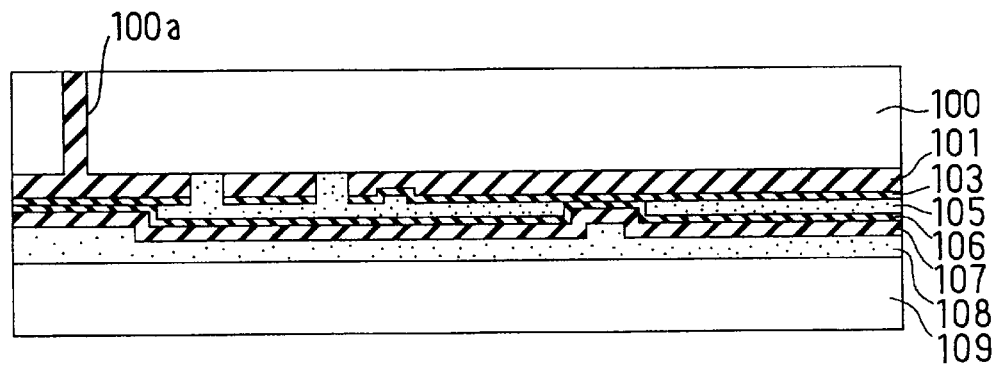

Next, as shown in FIG. 18G, the surface of the silicon substrate 100 on an opposite side of the silicon substrate 109 is mechanically polished until the silicon oxide layer 101 embedded in the groove 100a is exposed. As soon as the silicon oxide layer 101 embedded in the groove 100a is exposed by polishing, the polishing hardness of the substrate 100 changes, so that the end of the polishing process is easily recognized. The exposed silicon oxide layer 101 in the groove 100a can be used as an alignment mark in the successive processes.

Figure 18H:
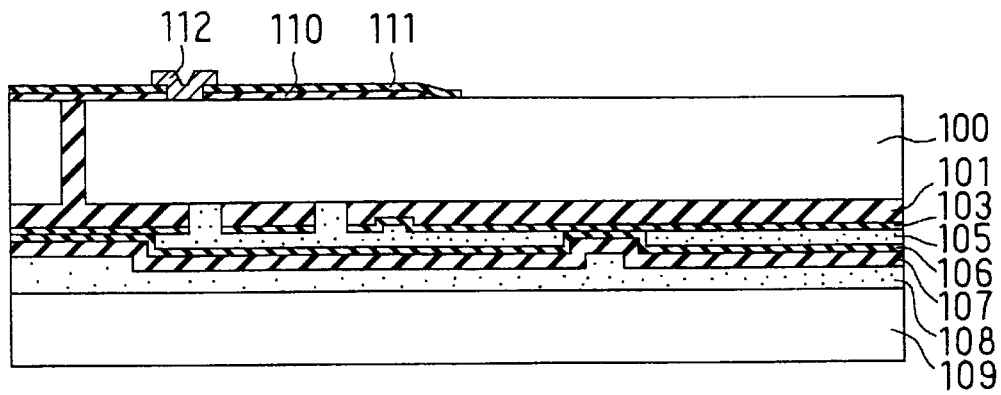
Figure 18I:
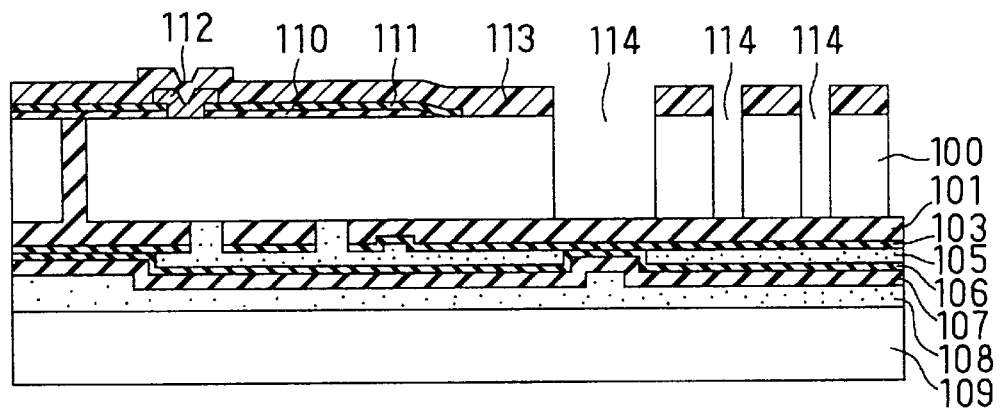

Then, as shown in FIG. 18H, an intermediate insulating layer 110 is deposited on the polished surface of the silicon substrate 100. The intermediate insulating layer 110 is patterned by dry-etching or the like to have a contact hole therein. Then, a silicon nitride layer 111 is formed on specific regions of the intermediate insulating layer 110, and an aluminum electrode 112 is formed in the contact hole. Thereafter, as shown in FIG. 18I, the silicon substrate is etched using a mask member 113, thereby forming the beam structures and the fixed electrodes. That is, grooves 114 for defining the beam structures and the fixed electrodes are formed in the silicon substrate 100 by trench-etching or the like. At that time, the mask member 113 is either one of a soft mask such as photo-resist and a hard mask such as an oxide layer.

Figure 18J:
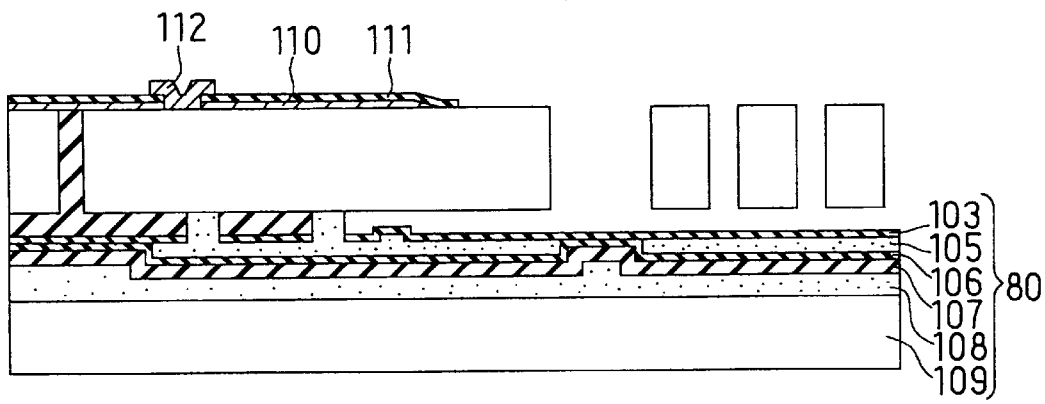

Finally, as shown in FIG. 18J, the silicon oxide layer 101 is removed by the sacrificial layer etching process using an etching solution containing HF, so that the beam structures become movable. After that, a dry process using a sublimation agent such as paradichlorobenzene is conducted. The sublimation agent is used to prevent the movable parts from attaching the surface of the substrate 80. Thus, the yaw rate sensor in the third embodiment is manufactured. Incidentally, the silicon substrate 109 and the layers 103, 105–108 disposed on the silicon substrate 109 constitute the substrate 80 shown in FIG. 17.

In the third embodiment, after the aluminum electrode 112 is formed, the grooves 114 for defining the beam structures and the fixed electrodes are formed in the silicon substrate 100 as in the second embodiment. Then, the silicon oxide layer 101 is removed by etching through the grooves 114. Therefore, the widths of the grooves 114 can be flexibly set, resulting in flexible design of the yaw rate sensor. The opening portions 104 for forming the anchor parts shown in FIG. 18B may be composed of a plurality of stripe-like openings with constant intervals as in the first embodiment. Accordingly, the same effects as those in the first embodiment can be provided.

In the first to third embodiments, the poly-silicon layer of the first silicon substrate is directly joined to the second silicon substrate in the bonding process. However, the poly-silicon layer may be joined to the second silicon substrate through an oxide layer which is formed on the surface of the second silicon substrate. In this case, due to the flowability in the joining portion caused by heat (approximately at 1200° C.) and the phase change of the poly-silicon layer, joining yield is improved.

In the first to third embodiments, although only one surface of the poly-silicon layer for being the anchor parts contacts the silicon nitride layer, the poly-silicon layer may be sandwiched by two silicon nitride layers. When the silicon oxide layer is disposed on the poly-silicon layer on the opposite side of the silicon nitride layer for serving the etching stopper in the sacrificial layer etching process, the silicon oxide layer directly underlies the silicon nitride layer in some regions. At the regions, there arise a possibility that the silicon oxide layer may be etched through the silicon nitride layer in the sacrificial layer etching process. As opposed to this, when the poly-silicon layer is sandwiched by the two silicon nitride layers, resistance to etching in the sacrificial layer etching process is improved.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of manufacturing a dynamic amount semiconductor sensor comprising a support substrate having first and second anchor parts protruding from a surface thereof, a beam structure supported by the first anchor part and having a movable electrode displaceable by a dynamic amount, and a fixed electrode supported by the second anchor part to face the movable electrode, the method comprising steps of:

forming a sacrificial layer on a first semiconductor substrate, the first semiconductor substrate being for forming the beam structure and the fixed electrode;

forming an insulating layer on the sacrificial layer;

forming first and second opening portions in the insulating layer and in the sacrificial layer where the first and second anchor parts are to be formed, at least one of the first and second opening portions being composed of a plurality of openings;

forming a first thin film on the insulating layer, the first thin film being for forming the first and second anchor parts;

forming a second thin film on the first thin film;

flattening a surface of the second thin film on an opposite side of the first thin film;

bonding the first semiconductor substrate and a second semiconductor substrate for serving as the support substrate with the second thin film interposed therebetween; and removing the sacrificial layer.

2. The method of claim 1, wherein the plurality of openings have stripe-like shapes with widths equal to one another.

3. The method of claim 1, wherein the second thin film is made of polycrystalline silicon.

4. The method of claim 1, wherein:

the fixed electrode has a pole-like part fixed to the support substrate via a third anchor part;

in the step of forming the first and second opening portions, a third opening portion including a stripe-like opening is formed in the insulating layer and in the sacrificial layer where the third anchor part is to be formed; and the plurality of openings of the one of the first and second opening portions have stripe-like shapes with widths equal to one another and equal to that of the stripe-like opening of the third opening portion.

5. The method of claim 1, wherein:

in the step of forming the first and second opening portions, an electrode terminal opening portion is formed in the insulating layer and in the sacrificial layer for forming an electrode terminal anchor part, the electrode terminal anchor part being for fixing thereon an electrode terminal part electrically connected to the fixed electrode, the electrode terminal opening portion being composed of a plurality of openings.

6. The method of claim 1, further comprising steps of:

forming an alignment groove in a first semiconductor substrate before the step of forming the sacrificial layer; and polishing a surface of the first semiconductor substrate on an opposite side of the second semiconductor substrate to expose the alignment groove after the step of bonding the first and second semiconductor substrates.

7. The method of claim 6, wherein the alignment groove is filled with the sacrificial layer in the step of forming the sacrificial layer.

8. The method of claim 6, wherein the alignment groove is filled with a material having a polishing rate approximately equal to that of the first semiconductor substrate before the step of forming the sacrificial layer.

9. The method of claim 8, wherein the first semiconductor substrate is made of single crystal silicon, and the material for filling the alignment groove is polycrystalline silicon.

10. A method of manufacturing a dynamic amount semiconductor sensor comprising a support substrate having first and second anchor parts protruding from a surface thereof, a beam structure supported by the first anchor part and having a movable electrode displaceable by a dynamic amount, and a fixed electrode supported by the second anchor part to face the movable electrode, the method comprising steps of:

forming a sacrificial layer on a first semiconductor substrate, the first semiconductor substrate being for forming the beam structure and the fixed electrode;

forming an insulating layer on the sacrificial layer;

forming first and second opening portions in the insulating layer and in the sacrificial layer where the first and second anchor parts are to be formed;

forming a first thin film on the insulating layer, the first thin film being for forming the first and second anchor parts;

forming a second thin film on the first thin film;

flattening a surface of the second thin film on an opposite side of the first thin film;

bonding the first semiconductor substrate and a second semiconductor substrate for serving as the support substrate with the second thin film interposed therebetween;

forming a plurality of grooves in the first semiconductor substrate for defining the beam structure and the fixed electrode in the first semiconductor substrate; and removing the sacrificial layer by etching through the plurality of grooves to provide the beam structure and the fixed electrode on the second semiconductor substrate.

11. The method of claim 10, further comprising a step of forming an electrode on the first semiconductor substrate on an opposite side of the second semiconductor substrate before the step of forming the plurality of grooves.

12. The method of claim 10, further comprising a step of forming an alignment mark on the first semiconductor substrate before the step of forming the sacrificial layer, the alignment mark being for defining positions of the plurality of grooves on the first semiconductor substrate.

13. The method of claim 12, wherein:
the alignment mark is an alignment groove formed in the first semiconductor substrate; and
the alignment groove is filled with the sacrificial layer to serve as the alignment mark when the sacrificial layer is formed on the first semiconductor substrate.

14. The method of claim 12, wherein:
the alignment mark is an alignment groove formed in the first semiconductor substrate;
the alignment groove is filled with a material having a polishing rate approximately equal to that of the first semiconductor substrate; and
the sacrificial layer is formed on the first semiconductor substrate to cover the alignment groove filled with the material.

15. The method of claim 14, wherein the first semiconductor substrate is made of single crystal silicon, and the material for filling the alignment groove is polycrystalline silicon.

16. The method of claim 12, further comprising a step of polishing the first semiconductor substrate on the opposite side of the second semiconductor substrate to expose the alignment groove after the step of bonding the first and second semiconductor substrates,
wherein an end of the step of polishing the first semiconductor substrate is detected by the exposure of the alignment groove.

17. A method of manufacturing a dynamic amount semiconductor sensor comprising a support substrate having first and second anchor parts protruding from a surface thereof, a beam structure supported by the first anchor part and having a movable electrode displaceable by a dynamic amount, and a fixed electrode supported by the second anchor part to face the movable electrode, the method comprising steps of:
forming a sacrificial layer on a first semiconductor substrate, the first semiconductor substrate being for forming the beam structure and the fixed electrode;
forming an insulating layer on the sacrificial layer;
forming first and second opening portions in the insulating layer and in the sacrificial layer where the first and second anchor parts are to be formed, at least one of the first and second opening portions being composed of a plurality of openings;
forming a first thin film on the insulating layer, the first thin film being for forming the first and second anchor parts;
forming a second thin film on the first thin film;
flattening a surface of the second thin film on an opposite side of the first thin film;
bonding the first semiconductor substrate and a second semiconductor substrate for serving as the support substrate with the second thin film interposed therebetween;
forming a plurality of grooves in the first semiconductor substrate for defining the beam structure and the fixed electrode in the first semiconductor substrate; and
removing the sacrificial layer by etching through the plurality of grooves to provide the beam structures and the fixed electrode on the second semiconductor substrate.

18. The method of claim 17, wherein the first and second opening portions are formed to respectively have a first plurality of openings and a second plurality of openings.

19. The method of claim 17, wherein:
the fixed electrode has a pole-like part fixed to the support substrate via a third anchor part;
in the step of forming the first and second opening portions, a third opening portion including a stripe-like opening is formed in the insulating layer and in the sacrificial layer where the third anchor part is to be formed; and
the plurality of openings of the one of the first and second opening portions have stripe-like shapes with widths equal to one another and equal to that of the stripe-like opening of the third opening portion.

20. The method of claim 17, wherein:
in the step of forming the first and second opening portions, an electrode terminal opening portion is formed in the insulating layer and in the sacrificial layer for forming an electrode terminal anchor part, the electrode terminal anchor part being for fixing thereon an electrode terminal part electrically connected to the fixed electrode, the electrode terminal opening portion being composed of a plurality of openings.

21. The method of claim 17, further comprising steps of:
forming an alignment groove in a first semiconductor substrate to be filled with the sacrificial layer in the step of forming the sacrificial layer; and
polishing a surface of the first semiconductor substrate on an opposite side of the second semiconductor substrate to expose the sacrificial layer in the alignment groove after the step of bonding the first and second semiconductor substrates.

22. The method of claim 17, further comprising a step of forming an alignment mark on the first semiconductor substrate before the step of forming the sacrificial layer, the alignment mark being for defining positions of the plurality of grooves on the first semiconductor substrate.

23. The method of claim 22, wherein:
the alignment mark is an alignment groove formed in the first semiconductor substrate; and
the alignment groove is filled with the sacrificial layer when the sacrificial layer is formed on the first semiconductor substrate.

24. The method of claim 23, further comprising a step of flattening the first semiconductor substrate on an opposite side of the second semiconductor substrate after bonding the first and second semiconductor substrates,
wherein the step of flattening the first semiconductor substrate is stopped when the sacrificial layer in the alignment groove is exposed.

* * * * *